(12) United States Patent
Yamaguchi

(10) Patent No.: US 10,047,784 B2
(45) Date of Patent: Aug. 14, 2018

(54) INSERT NUT, FASTENING UNIT INCLUDING THE INSERT NUT, AND PROCESS CARTRIDGE USING THE FASTENING UNIT

(71) Applicant: CANON KABUSHIKI KAISHA, Tokyo (JP)

(72) Inventor: Yoshimasu Yamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 14/624,992

(22) Filed: Feb. 18, 2015

(65) Prior Publication Data

US 2015/0247523 A1 Sep. 3, 2015

(30) Foreign Application Priority Data

Feb. 28, 2014 (JP) ................................ 2014-038875

(51) Int. Cl.
*F16B 33/00* (2006.01)
*F16B 37/12* (2006.01)
*F16B 5/02* (2006.01)

(52) U.S. Cl.
CPC .............. *F16B 37/122* (2013.01); *F16B 5/02* (2013.01)

(58) Field of Classification Search
CPC .................................. F16B 37/122; F16B 5/02
USPC .......................................... 411/180, 402, 403
See application file for complete search history.

(56) References Cited

U.S. PATENT DOCUMENTS

| 982,573 A | * | 1/1911 | Cade | |
|---|---|---|---|---|
| 2,395,063 A | * | 2/1946 | Paulus | F16B 37/122 217/113 |
| 2,562,327 A | * | 7/1951 | Moore | B24B 45/00 403/259 |
| 3,204,284 A | * | 9/1965 | Merriman | F16B 37/122 16/2.1 |

(Continued)

FOREIGN PATENT DOCUMENTS

| CN | 1272078 A | 11/2000 |
|---|---|---|
| CN | 101808811 A | 8/2010 |

(Continued)

OTHER PUBLICATIONS

Chinese Office Action issued in corresponding Chinese Patent Application No. 201510089898.9, dated Aug. 31, 2016.

(Continued)

*Primary Examiner* — Gary W Estremsky
(74) *Attorney, Agent, or Firm* — Fitzpatrick, Cella, Harper & Scinto

(57) ABSTRACT

An insert nut, which is configured to be inserted into a substrate made of a resin, the insert nut including: an internal thread portion into which a screw is to be fastened; a recess-and-protrusion-shaped portion formed on an outer surface of the insert nut, the recess-and-protrusion-shaped portion including a plurality of ridges and a plurality of roots formed alternately in a circumferential direction; and a flange portion formed on one end side in a screw axial direction of the internal thread portion, wherein a nominal diameter of the screw to be fastened into the insert nut is 3 mm or more, and an outer diameter of the flange portion is 2.4 times or more and 4 times or less as large as the nominal diameter of the screw to be fastened into the insert nut.

13 Claims, 22 Drawing Sheets

(56) References Cited

U.S. PATENT DOCUMENTS

| | | | | |
|---|---|---|---|---|
| 3,247,752 A * | 4/1966 | Greenleaf | ............. | F16B 33/004 277/637 |
| 3,646,981 A * | 3/1972 | Barnes | ...................... | F16B 5/01 228/135 |
| 4,800,643 A * | 1/1989 | Higgins | .................... | F16B 5/01 264/262 |
| 8,622,672 B2 * | 1/2014 | Babej | ................... | F16B 37/068 411/179 |
| 2003/0228171 A1 * | 12/2003 | Miyabe | .............. | G03G 21/1814 399/111 |
| 2010/0175811 A1 * | 7/2010 | Kumai | .................... | B29C 65/44 156/91 |
| 2012/0070226 A1 | 3/2012 | Su | | |
| 2013/0108392 A1 | 5/2013 | Henriksen, Jr. | | |
| 2014/0082922 A1 * | 3/2014 | Chalverat | ................ | F16B 19/02 29/525.02 |
| 2014/0271030 A1 | 9/2014 | Yamaguchi | | |
| 2015/0023757 A1 * | 1/2015 | Chang | ................... | F16B 37/048 411/173 |

FOREIGN PATENT DOCUMENTS

| | | | |
|---|---|---|---|
| CN | 102748347 A | | 10/2012 |
| EP | 2 514 980 A2 | | 10/2012 |
| JP | H07-291042 A | | 11/1995 |
| JP | H11-247817 A | | 9/1999 |
| JP | 2001-210969 A | | 8/2001 |
| JP | 2001317529 A | | 11/2001 |
| JP | 2007321930 A | | 12/2007 |
| JP | 2010-48308 A | | 3/2010 |
| KR | 10-1318720 B1 | | 10/2013 |

OTHER PUBLICATIONS

Search Report in European Patent Application No. 15156058.8, dated Dec. 15, 2015.
European Search Report dated Aug. 5, 2015 in European Patent Application No. 15156058.8.
U.S. Appl. No. 14/422,482 to Yoshimasu Yamaguchi, filed Feb. 19, 2015.
Japanese Official Action dated Dec. 5, 2017 in Japanese Patent Application No. 2014-038875.
Chinese Office Action issued in corresponding Chinese Application No. 201510089898.9 dated Apr. 16, 2018.
Korean Office Action issued in corresponding Korean Application No. 10-2015-0023825 dated May 31, 2018.

* cited by examiner

FIG. 13A
FIG. 13B
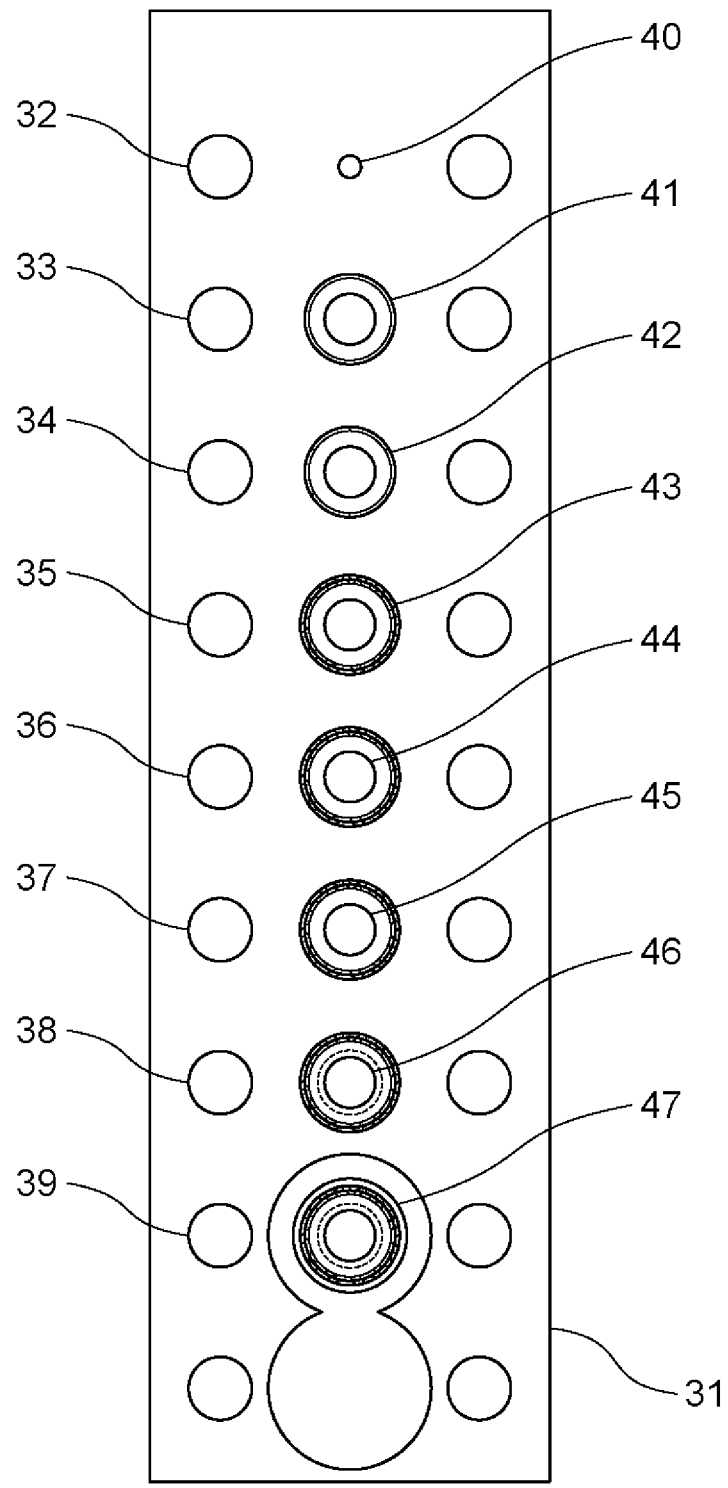
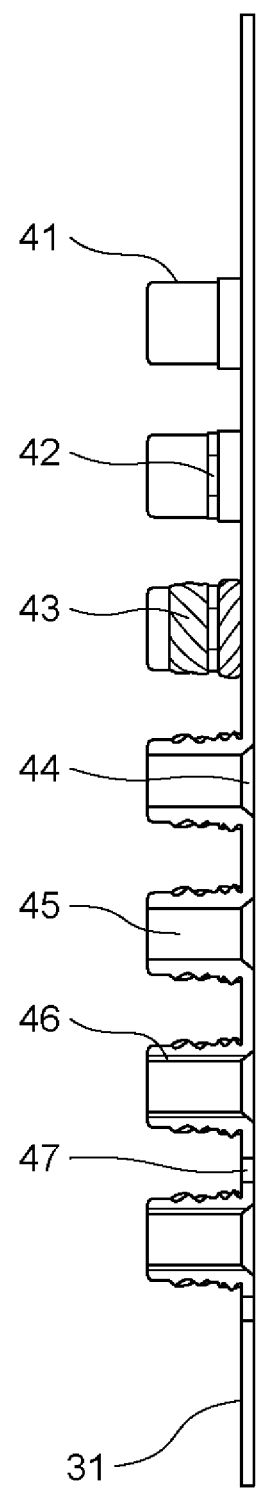

FIG. 14A
FIG. 14B
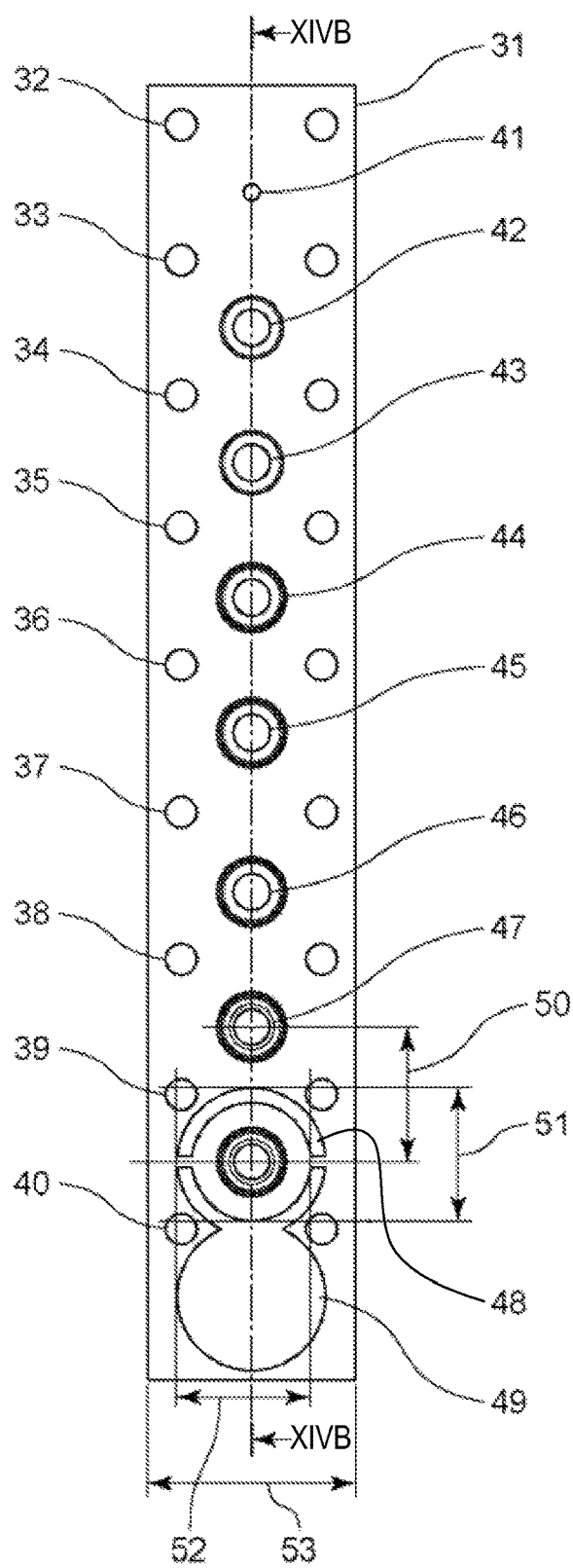
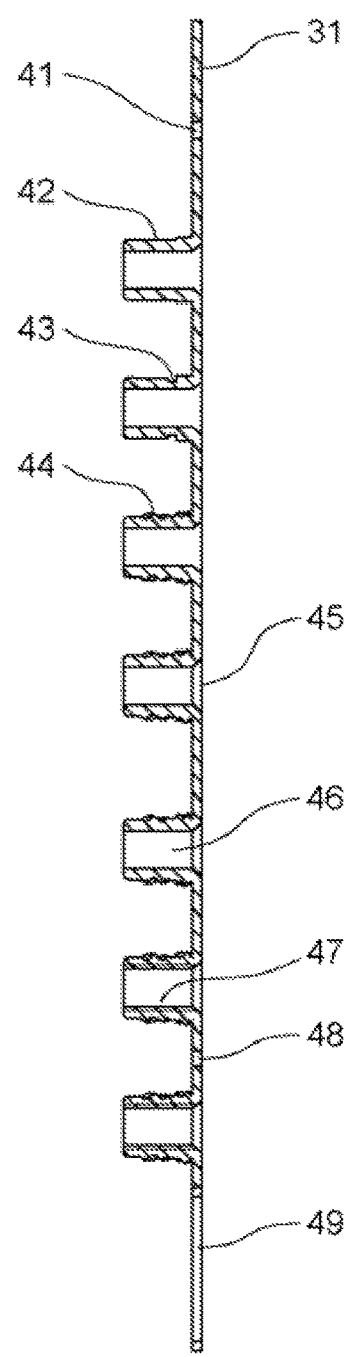

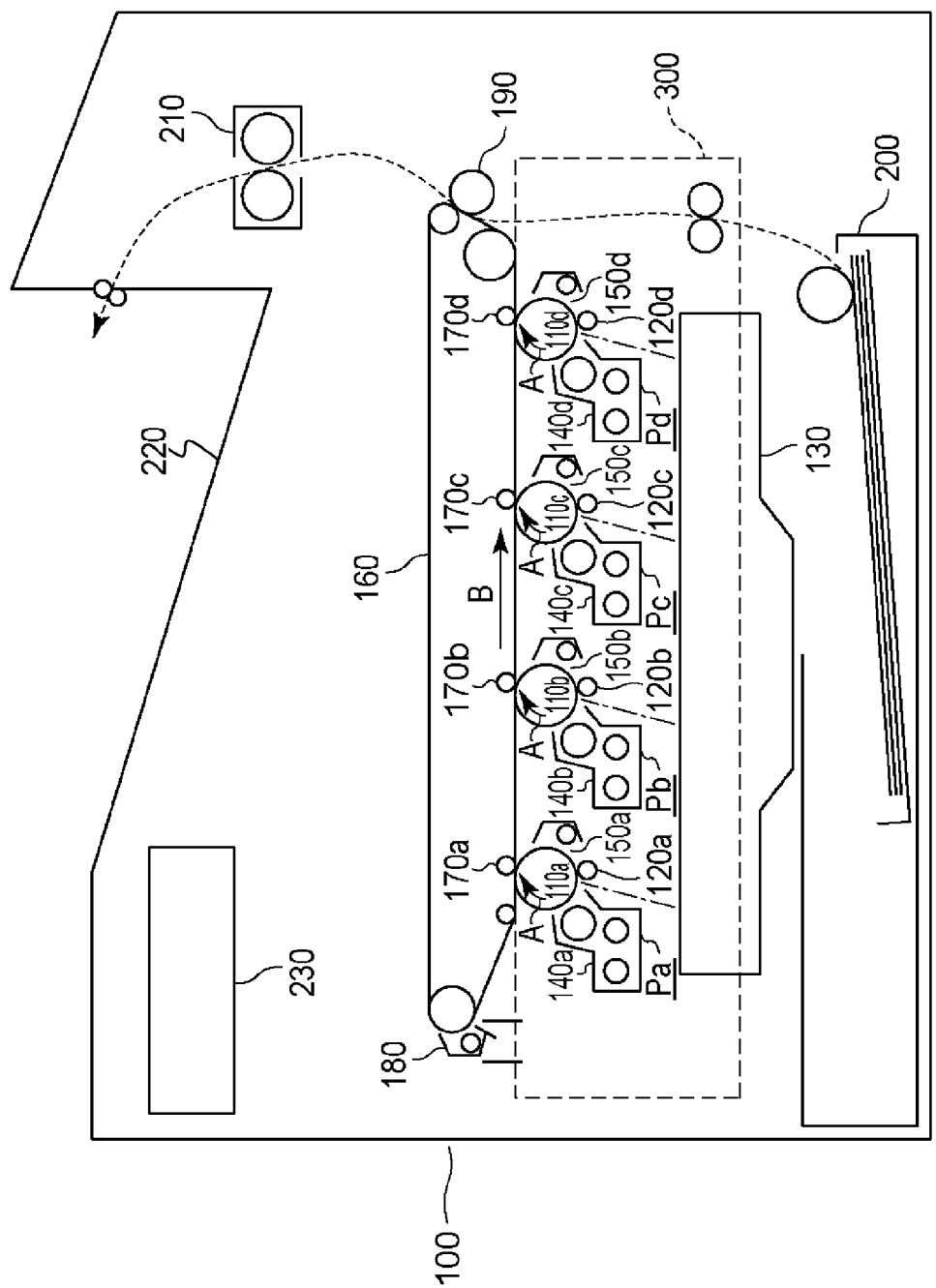

INSERT NUT, FASTENING UNIT INCLUDING THE INSERT NUT, AND PROCESS CARTRIDGE USING THE FASTENING UNIT

BACKGROUND OF THE INVENTION

Field of the Invention

The present invention relates to an insert nut, and more specifically, to a metal insert nut having an internal thread, which is to be inserted into and integrated with a hole portion of a mating plastic member, to thereby enable a screw clamp. In addition, the present invention relates to a fastening unit including the insert nut, and a process cartridge using the fastening unit.

Description of the Related Art

Hitherto, usage of a screw for resin has been known for carrying out screw fastening to a resin. However, when the screw for resin is repeatedly installed and removed, the resin is known to be plastically deformed, which may cause damage on an internal thread. In order to prevent this problem, there is known a method of mounting a metal insert nut into a resin component in advance, to thereby secure the thread strength.

As a configuration of such an insert nut, for example, a configuration as disclosed in Japanese Patent Application Laid-Open No. 2010-48308 is known. As in Japanese Patent Application Laid-Open No. 2010-48308, there is known an insert nut having a flange at the top surface. Hitherto, the insert nut has been provided with a flange so that, when a metal terminal is screw-fastened for earthing or the like, the metal terminal is securely sandwiched between the screw and the insert nut.

Further, in order to suppress loosening of the screw after screw fastening due to vibrations of the apparatus, as in Japanese Patent Application Laid-Open No. H11-247817, there is known a screw whose head has a flange formed into an umbrella shape (dish facing-down shape), which is widely used.

However, it has been found that the following problem occurs when the related-art insert nut is used. When the above-mentioned flanged screw is used for the flanged insert nut as disclosed in Japanese Patent Application Laid-Open No. 2010-48308 so as to enhance the fastening force with respect to a member to be fastened, in some cases, the insert nut is jacked up from a substrate during fastening, or the screw is loosened along with use. This is caused due to a difference between the flange diameter of the insert nut and the head diameter (flange diameter) of the screw, which is now described with reference to FIG. 6. FIG. 6 is a view illustrating a state of screw-fastening a member 68 to be fastened with use of an insert nut according to a comparative example (in FIG. 6, for easy understanding, the flange of the insert nut is illustrated large in a radial direction in an exaggerated manner). In general, the insert nut to be used in an image forming apparatus has a size of M3 (screw outer diameter of 3 mm) or more in order to obtain a predetermined breaking strength. In this case, the flange diameter of the flanged screw is substantially about 8 mm. Hitherto, the flange diameter of the insert nut has been about 5.5 mm. Therefore, as illustrated in FIG. 6, such a relationship that an outer diameter of a flange 64 of a screw 57 is larger than an outer diameter of a flange 3 of an insert nut 1 has been obtained. Due to this difference between the flange diameters, when the screw is fastened, a force (extraction force) of pulling out the insert nut 1 from the substrate strongly acts. When the extraction force exceeds the fixing force generated between the insert nut and the substrate, problems such as extraction of the insert nut from the resin and loosening of the screw may occur. Such problems may occur not only in the case of using the flanged screw but also in the case of using such a general-purpose screw that there is a large difference between the flange diameter of the insert nut and the outer diameter of the screw in a region where a seating face is brought into contact with a member to be fastened.

SUMMARY OF THE INVENTION

In view of the above, the present invention provides an insert nut which suppresses defects that may occur when a force of pulling out an insert nut from a substrate strongly acts during screw fastening.

In order to achieve the above-mentioned object, according to one embodiment of the present invention, there is provided an insert nut, which is configured to be inserted into a substrate made of a resin, the insert nut comprising: an internal thread portion into which a screw is to be fastened; a recess-and-protrusion-shaped portion formed on an outer surface of the insert nut, the recess-and-protrusion-shaped portion including a plurality of ridges and a plurality of roots formed alternately in a circumferential direction; and a flange portion formed on one end side in a screw axial direction of the internal thread portion, wherein a nominal diameter (an outer diameter of ridge) of the screw to be fastened into the insert nut is 3 mm or more, and an outer diameter of the flange portion is 2.4 times or more and 4 times or less as large as the nominal diameter of the screw to be fastened into the insert nut.

Further, in order to achieve the above-mentioned object, according to another embodiment of the present invention, there is provided an insert nut, which is configured to be inserted into a substrate made of a resin, the insert nut comprising: an internal thread portion into which a screw is to be fastened; a recess-and-protrusion-shaped portion formed on an outer surface of the insert nut, the recess-and-protrusion-shaped portion including a plurality of ridges and a plurality of roots formed alternately in a circumferential direction; and a flange portion formed on one end side in a screw axial direction of the internal thread portion, wherein an outer diameter of the flange portion is 2.5 times or more as large as a nominal diameter of the screw to be fastened into the insert nut.

Further, in order to achieve the above-mentioned object, according to another embodiment of the present invention, there is provided an insert nut, which is configured to be inserted into a substrate made of a resin, the insert nut comprising: an internal thread portion into which a screw is to be fastened; a recess-and-protrusion-shaped portion formed on an outer surface of the insert nut, the recess-and-protrusion-shaped portion including a plurality of ridges and a plurality of roots formed alternately in a circumferential direction; and a flange portion formed on one end side in a screw axial direction of the internal thread portion, wherein a nominal diameter of the screw to be fastened into the insert nut is 4 mm or more, and an outer diameter of the flange portion is 2.2 times or more and 4 times or less as large as the nominal diameter of the screw to be fastened into the insert nut.

Further, in order to achieve the above-mentioned object, according to another embodiment of the present invention, there is provided a fastening unit, which is configured to fasten a member to be fastened, the fastening unit comprising: an insert nut to be inserted into a substrate made of a resin; and a screw to be fastened into the insert nut, the insert nut comprising: an internal thread portion into which the screw is to be fastened; a recess-and-protrusion-shaped portion formed on an outer surface of the insert nut, the recess-and-protrusion-shaped portion including a plurality of ridges and a plurality of roots formed alternately in a circumferential direction; and a flange portion formed on one end side in a screw axial direction of the internal thread portion, wherein a nominal diameter of the screw to be fastened into the insert nut is 3 mm or more, and an outer diameter of the flange portion of the insert nut is equal to or more than 90% of an outer diameter of a contact portion of a seating face of the screw, which is brought into contact with the member to be fastened, when the screw is fastened.

Further, in order to achieve the above-mentioned object, according to another embodiment of the present invention, there is provided an fastening unit, which is configured to fasten a member to be fastened, the fastening unit comprising: an insert nut to be inserted into a substrate made of a resin; and a screw to be fastened into the insert nut, the insert nut comprising: an internal thread portion into which the screw is to be fastened; a recess-and-protrusion-shaped portion formed on an outer surface of the insert nut, the recess-and-protrusion-shaped portion including a plurality of ridges and a plurality of roots formed alternately in a circumferential direction; and a flange portion formed on one end side in a screw axial direction of the internal thread portion, wherein a nominal diameter of the screw to be fastened into the insert nut is 3 mm or more, and an outer diameter of the flange portion of the insert nut is equal to or more than 90% of an outer diameter of a screw head portion of the screw.

Further features of the present invention will become apparent from the following description of exemplary embodiments with reference to the attached drawings.

BRIEF DESCRIPTION OF THE DRAWINGS

FIG. 13A is a plan view illustrating a pressing process carried out by a related-art progressive press die.

FIG. 13B is a side view illustrating the pressing process carried out by the related-art progressive press die.

FIG. 14A is a plan view illustrating a pressing process carried out by a progressive press die according to the example.

FIG. 14B is a sectional view taken along the line XIVB-XIVB of FIG. 14A.

FIG. 15 is a schematic sectional view illustrating an overall image forming apparatus.

DESCRIPTION OF THE EMBODIMENTS

Now, embodiments of the present invention are described with reference to the drawings. Note that, in the following, unless particular description is made, various configurations may be replaced with other well-known configurations having similar functions without departing from the gist of the invention. That is, unless particular description is made, the present invention is not intended to be limited to only the configurations described in the embodiments below.

Example 1

[Insert Nut]

An insert nut 1 according to the example will be described with reference to the drawings. The insert nut 1 according to the example is used for a screw 57 to be fastened through intermediation of a member 56 to be fastened. Note that, in the example, as the screw to be fastened into the insert nut 1, a flanged screw will be described as an example, but the present invention is not limited thereto. The insert nut according to the example is an insert nut to be used for an image forming apparatus or the like, and an insert nut of M3 or more (screw outer diameter of 3 mm or more) is used in order to obtain a predetermined breaking strength.

Figure 1:
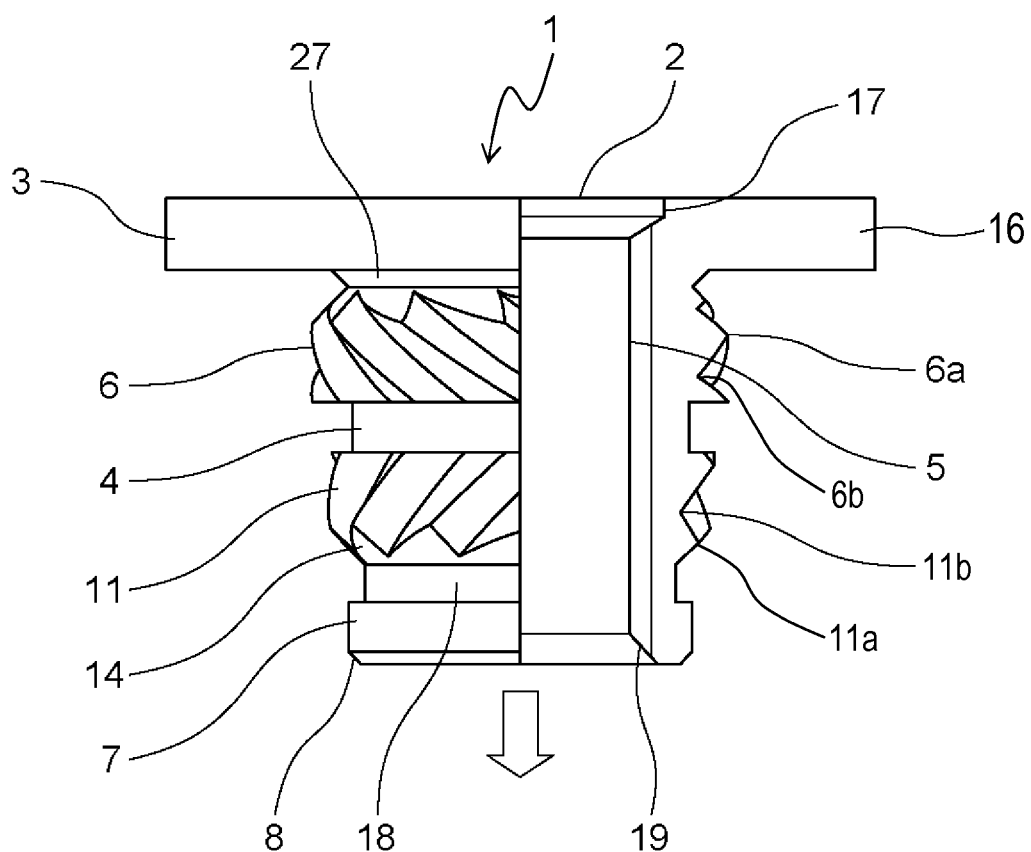
FIG. 1 is a partial sectional front view of an M3 insert nut according to an example.
Figure 2:
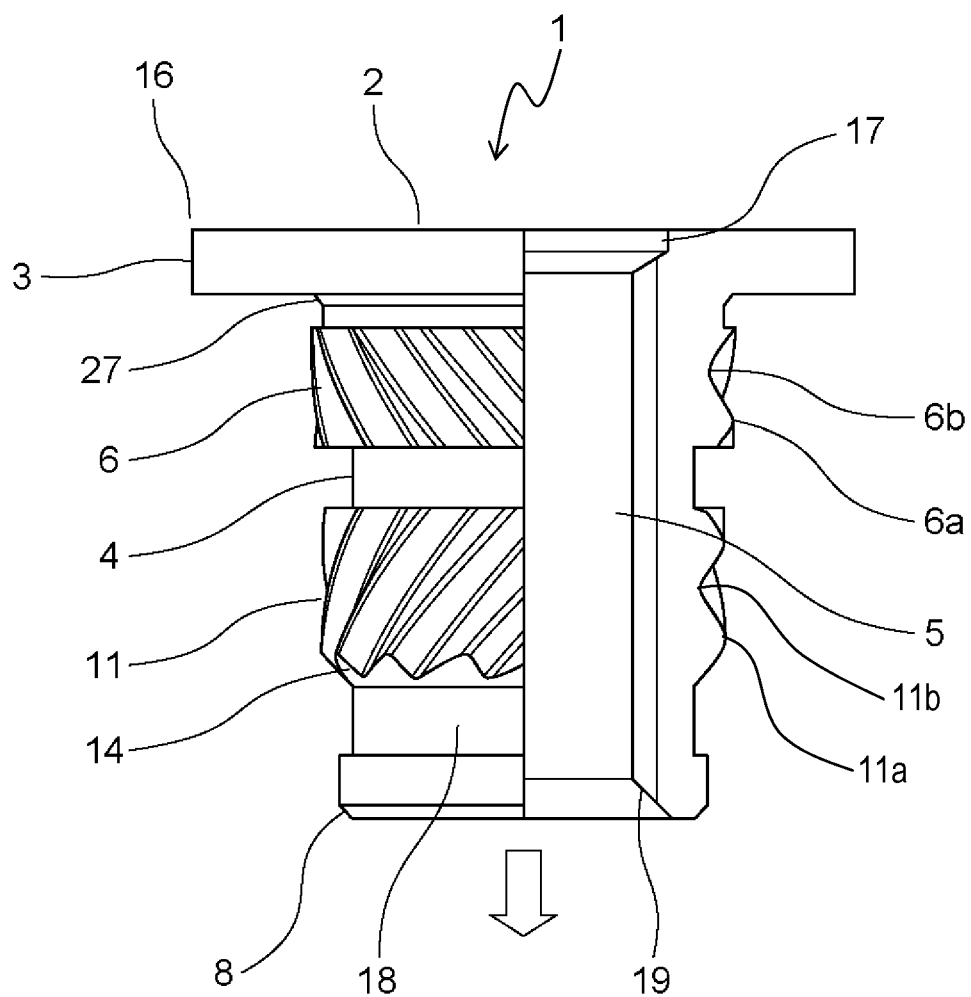
FIG. 2 is a partial sectional front view of an M4 insert nut according to the example.

FIG. 1 is a partial sectional front view illustrating a configuration of a flanged insert nut for an M3 screw (metric coarse thread with a nominal diameter of 3 mm). FIG. 2 is similarly a partial sectional front view illustrating a configuration of a flanged insert nut for an M4 screw (metric coarse thread with a nominal diameter of 4 mm). Note that, the nominal diameter of the screw is defined by, for example, JIS B 0101, and is a nominal dimension representing the reference dimension of the outer diameter of the ridge. The nominal diameter is expressed in a representative dimension not including a dimensional tolerance, but the expression substantially means to include a dimensional tolerance. For example, in the case of a metric coarse thread M3, the nominal diameter is 3 mm. In the case where the pitch of the metric coarse thread is 0.5 mm 6 G, the dimensional tolerance of the outer diameter of the external thread is from −0.036 to −0.142 mm. That is, the diameter is from 3−0.036 to 3−0.142.

Figure 3:
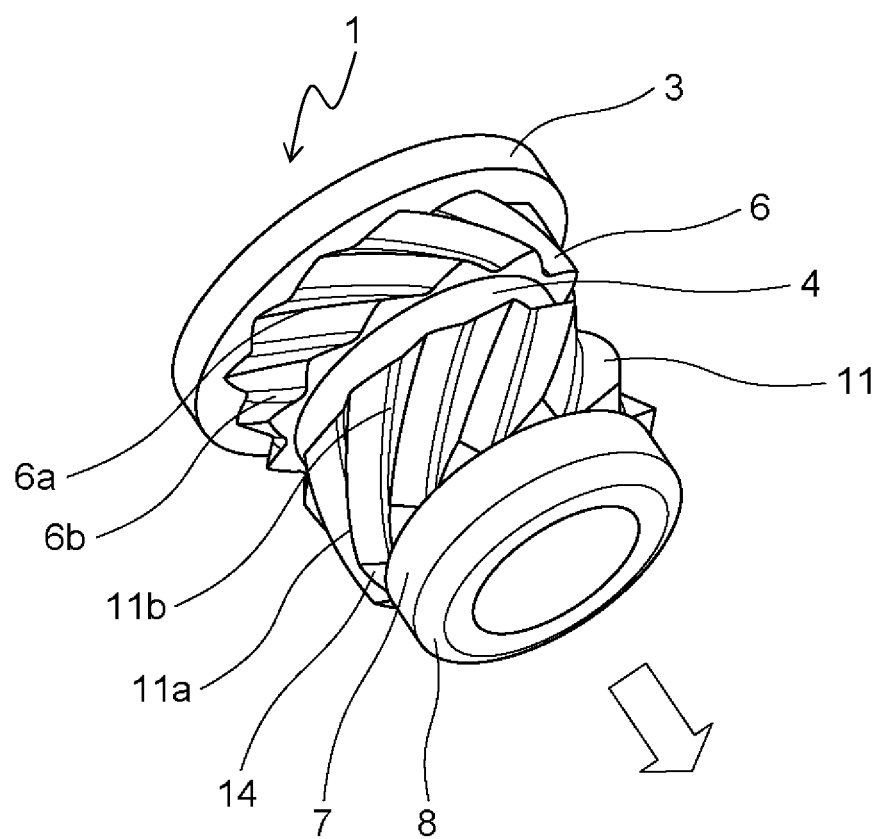
FIG. 3 is a perspective view of the insert nut according to the example.
Figure 8A:
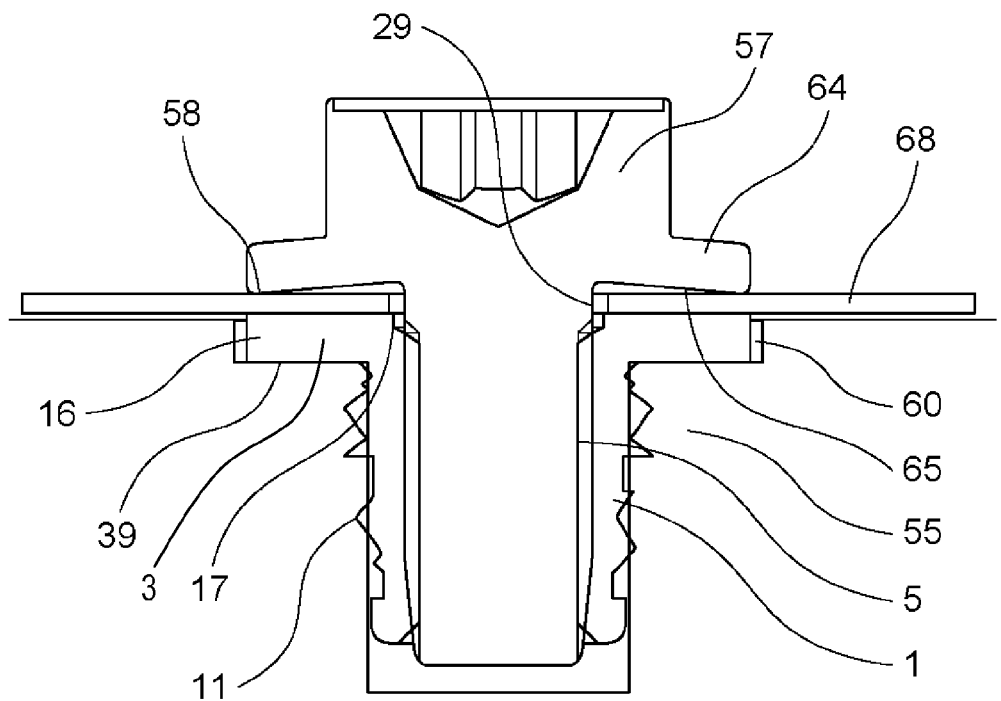
FIGS. 8A and 8B are sectional views in which the insert nut according to the example is mounted and applied to a thin plate.
Figure 8B:
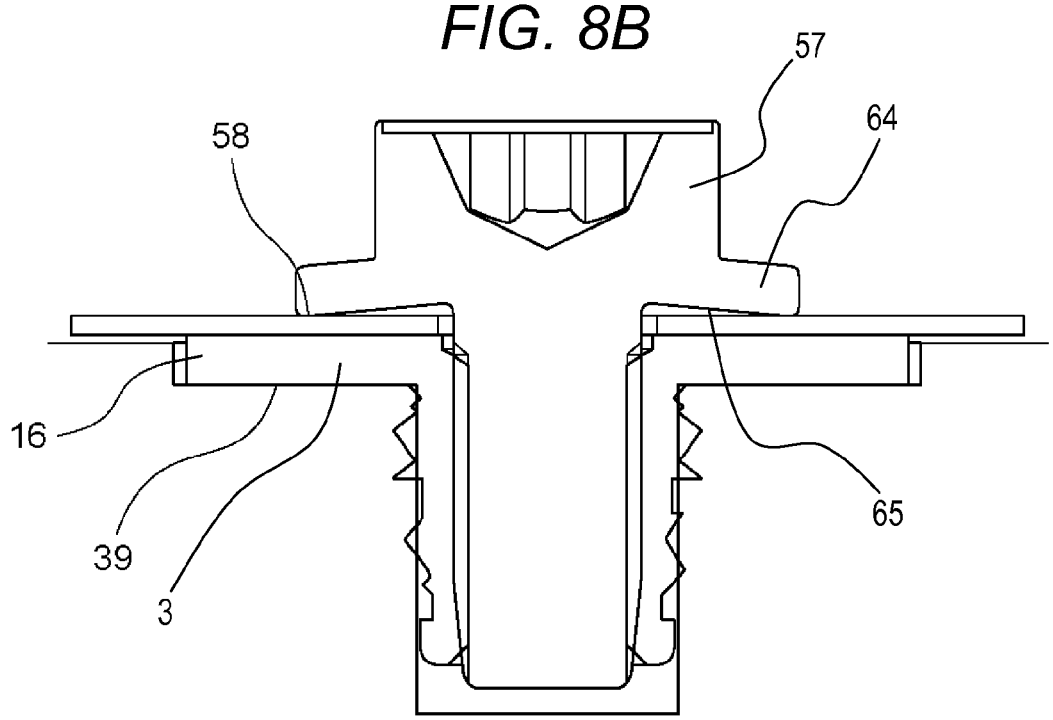

Further, FIG. 3 is a perspective view of the flanged insert nut. FIGS. 8A and 8B are sectional views in which the insert nut according to the example is used to fasten a thin plate 68 as a member to be fastened with respect to a resin substrate 55.

In the insert nut 1 according to the example, the direction of the arrow of FIGS. 1 to 3 is an insert nut press-fitting direction (insertion direction). The insert nut 1 has a flange 3 at an upper portion of one end in a longitudinal direction of the cylinder, which is on one end side in the screw insertion direction (screw axial direction). From a top surface 2 of the flange 3, a cylindrical portion (press-fitting portion) 7 drawn into a cylindrical shape by pressing, and a rounded portion 8 formed at the leading end portion of the cylindrical portion 7 are formed. The outer surface of the insert nut 1 is subjected to knurling at two portions. One portion corresponds to a first knurled portion (first recess-and-protrusion-shaped portion or first region) 6 positioned on the upstream side in the insert nut press-fitting direction. The other portion corresponds to a second knurled portion (second recess-and-protrusion-shaped portion or second region) 11 positioned on the downstream side in the insert nut press-fitting direction. The recess-and-protrusion-shaped portion has a ridged helical shape alternately including a plurality of ridges and a plurality of roots in a circumferential direction of the insert nut 1. When the insert nut 1 is thermally press-fitted into a mating resin member, a resin enters gaps between the recess-and-protrusion shapes on the surface of the knurled portion, and thus the insert nut 1 is mounted into the mating resin member. The knurled portion prevents the insert nut 1 from being rotated together with the screw (external thread) when the screw is inserted so as to be rotated and fastened after the insert nut 1 is mounted. The outer diameters of the first knurled portion 6 and the second knurled portion 11 are formed so as to be larger than the outer diameter of the cylindrical portion 7 and smaller than the outer diameter of the flange 3.

On the other hand, on the inner diameter portion of the insert nut 1, from a screw guide portion 19 configured to guide the screw, an internal thread 5 with the size of M3 or M4 is formed with a roll tap or a cut tap. On the outer periphery of the insert nut 1, the cylindrical portion 7, a cylindrical portion 18, a cylindrical portion 4, and a clearance shape 27 are formed. The diameter of the cylindrical portion 18 is formed slightly smaller than that of the cylindrical portion 7 serving as an extraction preventing unit, to thereby form a step that prevents extraction in the extraction direction by causing a resin to flow into the step due to thermal press-fitting.

Further, a guide inclined surface 14, the first knurled portion 6 and the second knurled portion 11, which correspond to the recess-and-protrusion portions serving as a rotation inhibiting unit, the cylindrical portion 4, and the clearance shape 27 are configured to be caused to fit to the semi-molten or softened resin material.

Now, the knurled portions illustrated in FIGS. 1 to 3 will further be described. In each of the knurled portions, ridges 6a and 11a and roots 6b and 11b are alternately formed so as to be adjacent to each other. Further, the first knurled portion 6 and the second knurled portion 11 are formed so as to have different torsional directions (directions in which the ridge and the root continue) from each other. This configuration is obtained so as to prevent, when the screw is inserted and rotated after the insert nut is press-fitted, the insert nut from moving in the press-fitting direction or in the reverse direction along with the rotation of the screw. Further, consideration is given so that the resin that melts and flows through heating reaches to every corner while being caused to fit to the knurled portions. Note that, the number and the size of the ridges 6a and 11a may be appropriately optimized so that the resin that melts and flows may be caused to fit to the knurled portions.

In the example, as illustrated in FIG. 2, the first knurled portion 6 and the second knurled portion 11 are formed so that the roots 6b and 11b and the ridges 6a and 11a have rounded shapes (curvature shapes), to thereby cause the resin to easily enter the gaps. Specifically, the value of the curvature radius of the rounded shape is set within a range of 0.05 mm or more and 0.2 mm or less. When the value of the curvature radius of the rounded shape is smaller than 0.05 mm, the shape becomes sharp, and hence the resin is less liable to enter the gap. On the other hand, when the value of the curvature radius exceeds 0.2 mm, the roots 6b and 11b become shallow, which may reduce the fixing strength of the insert nut.

The insert nut 1 according to the example is thermally press-fitted into a prepared hole 54 formed in the resin substrate 55, which is a member into which the insert nut is mounted, by mold insert molding, room-temperature press-fitting, or a heating method such as heater heating and ultrasonic heating.

Next, the counterbore 17, which is a stepped portion, will be described. In FIG. 1, the stepped portion (counterbore) 17, which is a straight cylindrical portion having a diameter larger than the diameter of the internal thread, is formed at a hole end portion of the internal thread 5 on the top surface 2 side in the longitudinal direction of cylinder of the insert nut 1. The stepped portion (counterbore) 17 serves as a processing guide for preventing decentering, misalignment, and deformation during knurling of the first knurled portion 6, the second knurled portion 11, or the like. Further, the stepped portion (counterbore) 17 is formed into a clearance shape that is longer than a root incomplete thread part of the foot portion of the screw to be fastened.

Forming the counterbore portion 17 enables maximum reduction of the decentered amount on the inner and outer diameters, to thereby facilitate formation of an ideal knurled shape. With this, the contact surface performance with the mating resin is maximized, to thereby prevent adverse effects due to maximized tightening rotational torque and extraction force and the overlapping of an incomplete thread part 29 during screw fastening. Thus, an accurate tightening torque can be obtained.

In general, the end of the thread in the cylindrical portion is chamfered, and under a state in which this part is supported by the center of a conical rotator taper-chucked to the lathe, the outer diameter portion is knurled. However, it is known that, when stain and chips adhere to the center, the chamfered surface may be slightly shifted. Further, when a large rolling pressurizing force is applied, the cylindrical shape of the insert nut may be deformed, which may remarkably deteriorate the accuracy of the thread and adversely affect the screw fastening. The stepped portion 17 also plays a role to define the accurate center position so as to solve the above-mentioned problem.

[Screw]

Further, as the screw according to the example, a commercially available RS-TITE (trademark) produced by NITTO SEIKO CO., LTD. is used. This screw includes, as illustrated in FIGS. 8A and 8B, a flange 64 having a dish-like recessed portion 65 such as the washer faced screw (flanged screw) 57. The diameter and the dish shape of the flange 64 are formed for the purpose of achieving a sufficient fastening strength and reducing the loosening torque during screw fastening. Therefore, when the diameter of the flange 64 is small, the torque is reduced, and hence the tightening torque becomes insufficient and the screw is easily loosened. Further, when the diameter of the flange 64 is large, the tightening torque is increased, but becomes wasteful because the torque significantly exceeds the breaking torque of the screw 57. In a case of the screw including the flange 64 having the dish-like recessed portion 65 such as the washer faced screw 57, the outer diameter of the flange 64 is about 2.5 times as large as the screw outer diameter.

That is, an appropriate tightening torque is about 70% of the breaking strength of the screw, and hence there is an optimum value corresponding thereto. When the torque exceeds the breaking strength, the head of the screw may break first, or the ridge of the tap, which corresponds to the ridge and the root of the screw, may be damaged, which causes damage not only on the screw but also on the mating member. Therefore, it is preferred that the outer diameter of the head portion of the screw (flange outer diameter) be reduced to 4 times or less as large as the outer diameter of the screw.

[Top Surface of Insert Nut]

The top surface 2 of the flange 3 of the insert nut 1 according to the example is a flat surface that is substantially perpendicular to the axial direction of the screw to be mounted.

Regarding the angle, the insert nut 1 is set so as to protrude from the resin substrate 55, and hence the member 56 to be fastened follows the top surface 2 of the insert nut 1 when being mounted. Therefore, although described later, it is preferred that the top surface 2 be processed while being guided so that the top surface 2 becomes perpendicular to the inner diameter of the cylindrical portion during manufacture.

Note that, when the top surface of the insert nut is embedded under the resin surface, the member 56 to be fastened may warp (not shown) during screw fastening, or the screw fastening force may directly act on the extraction force. Therefore, the insert nut may be easily pulled out, which causes jack-up. Therefore, in the example, the top surface of the insert nut 1 is formed so as to be flush with the surface of the resin substrate 55, or slightly protrude from the surface of the resin substrate 55. However, the effects of the present invention can be obtained even when the insert nut is used while being embedded under the resin surface.

Further, the flatness of the top surface 2 is set within a range of 0.03 mm to 0.05 mm. Further, the thickness of the flange 3 is set within a range of 0.6 mm to 1.0 mm.

[Flange Portion of Insert Nut]

An outer diameter 60 of the flange 3 of the insert nut 1, which is the characteristic part of the present invention, will be described. As described above as a problem, when the outer diameter 60 of the flange 3 of the insert nut 1 is smaller than the flange 64 of the screw 57, a force of pulling out the insert nut 1 from the resin substrate strongly acts. In view of this, as illustrated in FIGS. 8A and 8B, according to the example, the outer diameter of the flange 3 of the insert nut 1 is set so that a contact portion 58 of the flange (seating face) 64 of the screw 57 with respect to the member 68 to be fastened is positioned in the vicinity of the outer diameter of the flange 3 of the insert nut 1. Further, the flange diameter 60 of the insert nut 1 is set to be equal to or larger than the diameter of the contact portion 58.

Note that, it is preferred that the flange diameter 60 of the insert nut 1 be equal to or larger than the outer diameter of the contact portion 58 of the screw 57 (or the flange diameter of the screw 57 (outer diameter of the screw head portion)), but the flange diameter 60 of the insert nut 1 may be slightly smaller than the outer diameter of the contact portion 58. That is, the effects of the present invention can be obtained when the flange diameter 60 of the insert nut 1 is equal to or more than 90% of the flange diameter of the screw 57.

In the case of the screw including the flange 64 having the dish-like recessed portion 65 such as the general-purpose washer faced screw 57, the flange outer diameter of the screw is about 2.5 times as large as the screw outer diameter.

Therefore, it is preferred that the flange diameter of the insert nut be 2.5×0.9=2.4 times or more as large as the nominal diameter of the screw to be inserted into the insert nut, more preferably 2.5 times or more as large as the nominal diameter.

For example, in the case of an M3 screw, the flange diameter of the general-purpose screw is about 8 mm, and hence it is preferred that the flange diameter of the insert nut be 8×0.9=7.2 mm or more. It is more preferred that the flange diameter of the insert nut be equal to or larger than the screw flange diameter. Therefore, in the case of M3 or more, the flange diameter of the insert nut is preferred to be 8 mm or more. In other words, it is more preferred that the flange diameter of the insert nut be 8/3 or more as large as the screw outer diameter of the screw to be inserted into the insert nut.

Further, in the case of an M4 screw, the flange diameter of the general-purpose screw is 10 mm, and hence it is preferred that the flange diameter of the insert nut be 10×0.9=9 mm or more. In the case of M4 or more (in the case where the screw outer diameter is 4 mm or more), the flange diameter of the insert nut is preferred to be 10 mm or more.

Further, in the case of M4, the following expression is obtained: (general-purpose screw flange diameter/screw outer diameter)×0.9=(10/4)×0.9=2.25. Therefore, in the case of M4 or more, it is preferred that the flange diameter of the insert nut be (10/4×0.9)=2.2 times or more as large as the screw outer diameter of the screw to be inserted into the insert nut, more preferably (10/4)=2.5 times or more as large as the screw outer diameter.

As described above, according to the example, the flange diameter of the insert nut 1 is set to be at least 2.4 times or more as large as the nominal diameter of the screw 57 to be mounted. With this, the defects that may occur when a force of pulling out the insert nut 1 from the resin substrate 55 strongly acts during screw fastening are suppressed.

Further, by setting the flange diameter of the insert nut 1 as in the example, the mounting surface of the insert nut 1 is enlarged. Therefore, when the insert nut 1 is thermally press-fitted into the resin substrate 55, it is possible to suppress sinking of the insert nut 1 on the resin substrate 55 side. Further, during screw fastening, it is possible to suppress deformation of the member to be fastened, which is to be sandwiched between the top surface 2 of the insert nut 1 and the screw.

Specifically, according to the example, when the nominal diameter of the insert nut 1 at the internal thread portion is M3, the flange diameter of the insert nut 1 is set to 8 mm.

Similarly, when the nominal diameter of the insert nut 1 at the internal thread portion is M4, the flange diameter of the insert nut 1 is set to 10 mm.

Note that, when the ratio of the flange diameter of the insert nut to the nominal diameter of the screw is 4 times or more, the material cost may be wasted and the manufacture cost may be increased when the insert nut is manufactured. Therefore, the ratio is preferred to be 4 times or less. In the example, as a result of studies considering the type of the screw and the like, the flange diameter of the insert nut 1 is limited and optimized into a range with an optimum size that matches with a practicable dimension.

FIGS. 8A and 8B are sectional views illustrating a state in which the material 68 to be fastened is fastened with use of a fastening unit including the insert nut 1 according to the example and the screw 57 according to the example. The insert nut 1 is thermally press-fitted so as to abut against a wide seating face 39 of the resin substrate 55, and is held and fixed by a locking unit such as the knurled portions.

The contact portion 58 of the peripheral part of the dish-like recessed portion 65 of the flange 64 of the screw 57 matches with an outer peripheral portion 16 of the flange 3 of the insert nut 1 so as to sandwich the member 68 to be fastened as a thin plate. Therefore, a screw fastening force is not applied to the locking unit such as the knurled portions 11 and 6 as a load.

Comparative Example

Figure 4A:
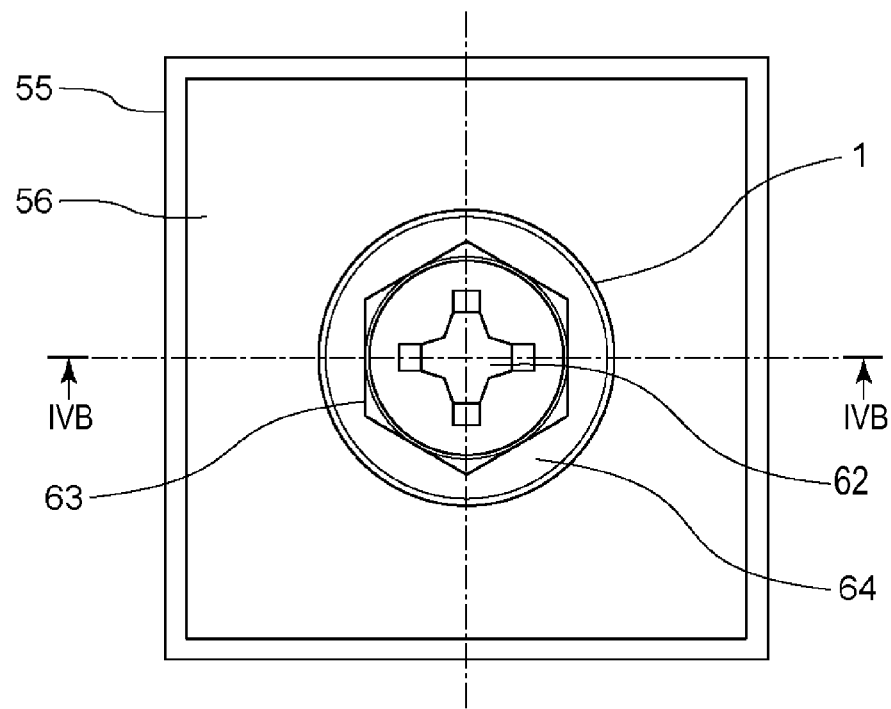
FIG. 4A is a plan view illustrating a usage state in which an insert nut according to a comparative example is mounted.
Figure 4B:
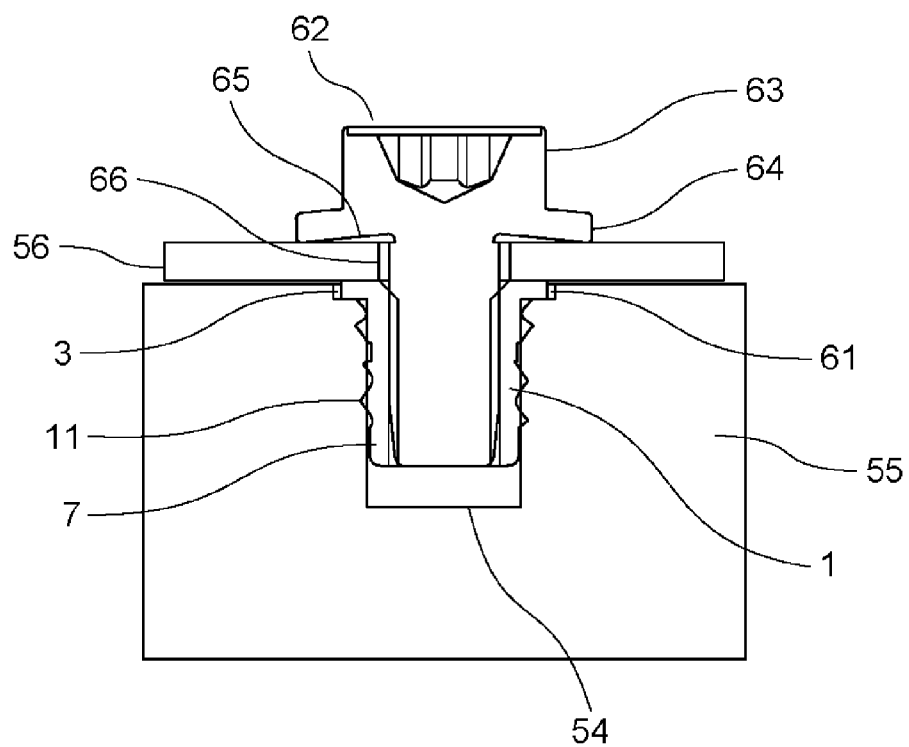
FIG. 4B is a sectional view taken along the line IVB-IVB of FIG. 4A.
Figure 5:
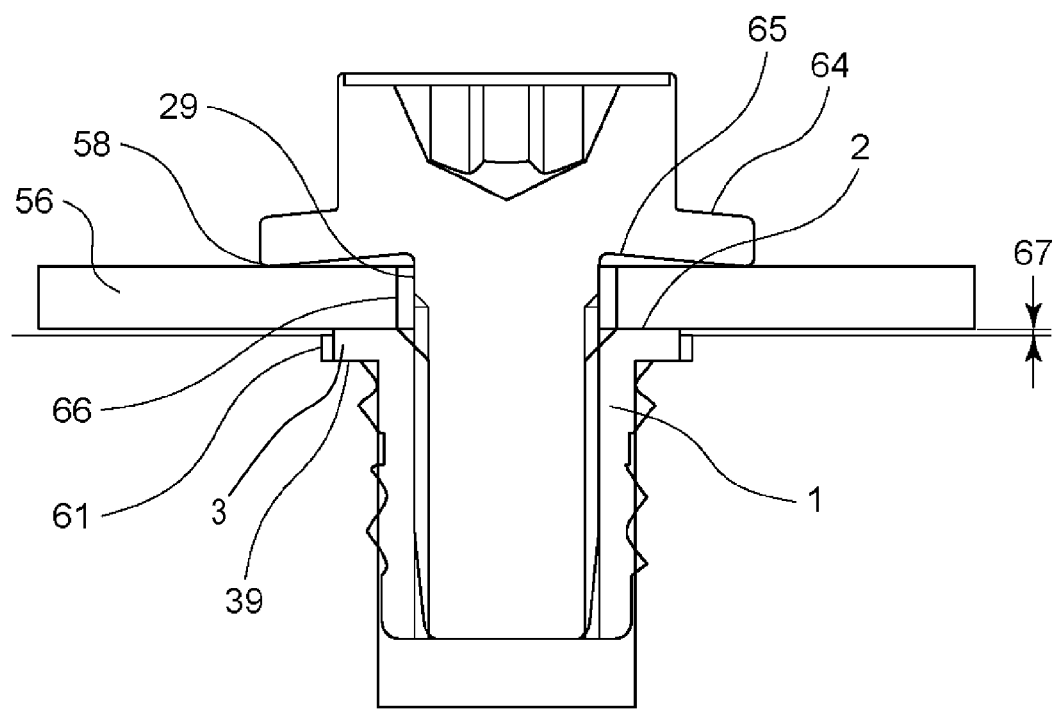
FIG. 5 is a detailed sectional view of the usage state in which the insert nut according to the comparative example is mounted.
Figure 6:
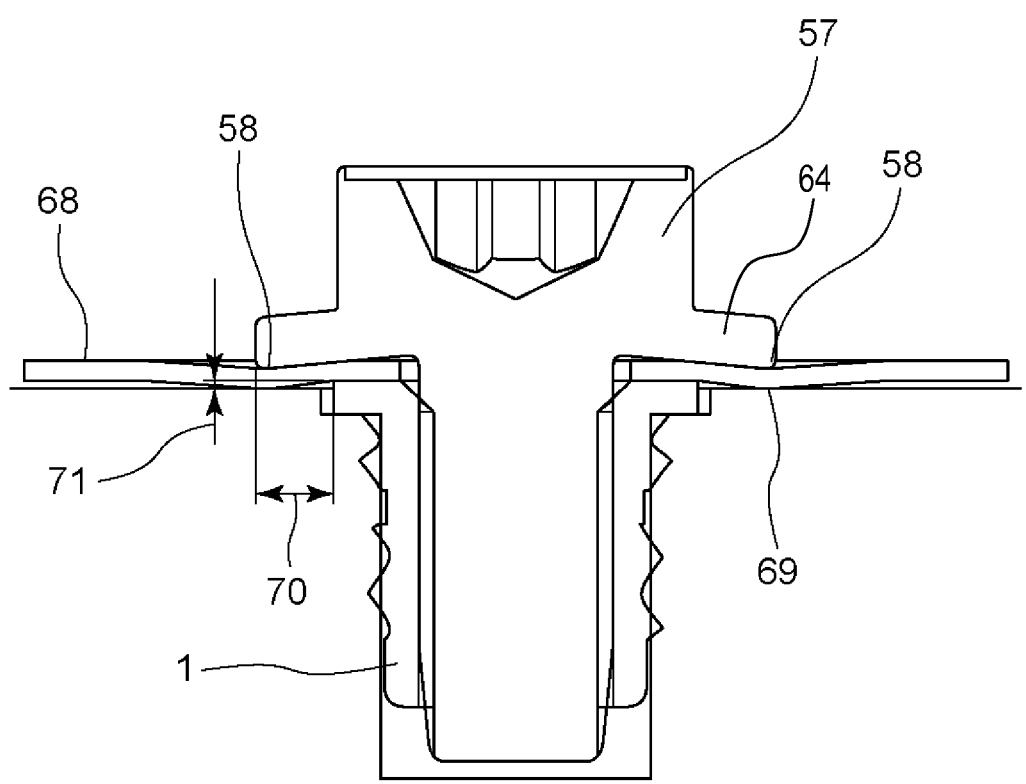
FIG. 6 is a sectional view in which the insert nut according to the comparative example is mounted and applied to a thin plate.
Figure 7:
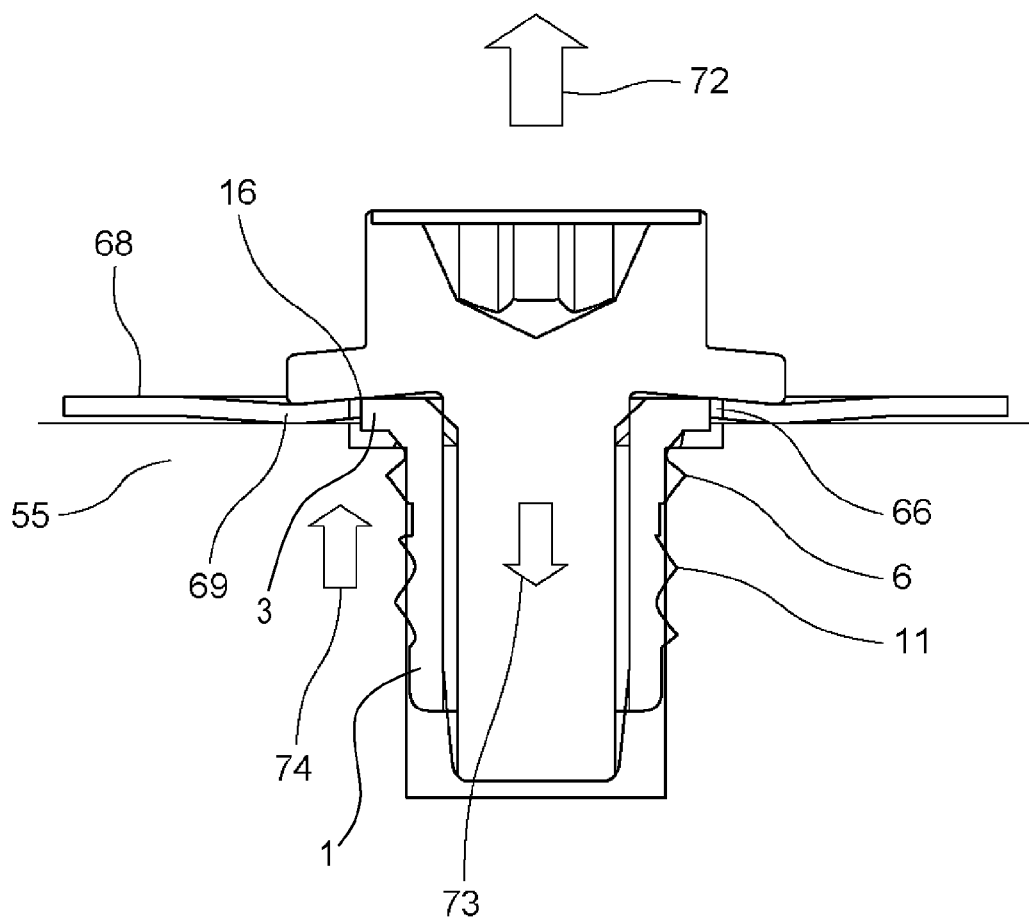
FIG. 7 is a sectional view of an extraction state in which the insert nut according to the comparative example is mounted and applied to a thin plate.

Now, a comparative example will be described. FIG. 4A is a plan view illustrating a usage state in which the insert nut according to the comparative example is mounted, FIG. 4B is a sectional view taken along the line IVB-IVB of FIG. 4A, and FIG. 5 is a detailed sectional view of the comparative example. FIG. 6 is a sectional view in which the insert nut according to the comparative example is mounted and applied to a thin plate. FIG. 7 is a sectional view of an extraction state in which the insert nut according to the comparative example is mounted and applied to a thin plate.

FIGS. 4A, 4B, and 5 illustrate a state in which the prepared hole 54 is formed at the center portion of the resin substrate 55, and the insert nut 1 according to the comparative example is mounted therein. While being guided by the press-fitting guide cylindrical portion 7, the second knurled portion 11 and the first knurled portion 6 are caused to fit and held with the mating resin in an overlapping manner. The flange 3 of the insert nut 1 is caused to enter a recessed portion 61 of the resin substrate 55 (see FIG. 5) so as to abut against the seating face 39.

The member 56 to be fastened is fastened with the screw 57 so as to abut against the top surface 2 of the insert nut 1.

As the washer faced screw 57 illustrated in FIGS. 4A, 4B, 5, 6, and 7, a commercially available RS-TITE produced by NITTO SEIKO CO., LTD. is used similarly to the example. The screw head portion includes a nut driver shape 63 in a hexagon bolt shape, and a driver cross recess 62 in a center surface of the screw head portion.

The washer faced screw 57 includes the flange 64 having the dish-like recessed portion, and the contact portion 58 is present in the periphery of the flange 64. When the screw 57 is screwed from a mounting hole 66 of the member 56 to be fastened, as illustrated in FIG. 5, the contact portion 58 of the screw flange 64 is brought into contact with the member 56 to be fastened, to thereby fasten and pressurize the member 56 to be fastened. In FIG. 5, the thickness of the member to be fastened is large, and hence the screw fastening is completed while securing a gap 67 when the member to be fastened abuts against the top surface 2 of the insert nut.

FIG. 6 illustrates a state in which the member 68 to be fastened as a thin plate is fastened with use of the insert nut according to the comparative example. As the operation of fastening the screw 57 progresses, the member 68 to be fastened as a thin plate is pressed by the contact portion 58 so as to be deformed to reach a sandwiching position 69, and is pressed at a diameter difference dimension 70 to be permanently deformed by a stepped dimension 71. Even when the screw 57 is loosened from this state, the deformed thin plate 68 cannot return to its original shape. Further, as the operation of fastening the screw further progresses, the insert nut 1 is pulled out by an action from the contact portion 58.

FIG. 7 is a view in which the member 68 to be fastened as a thin plate is fastened in a case where the insert nut according to the comparative example is used. FIG. 7 illustrates a fastening state of a case where the mounting hole 66 of the member 68 to be fastened is larger than the outer diameter of the flange 3 of the insert nut 1. Similarly to FIG. 6, the member 68 to be fastened as a thin plate is deformed. Further, through the action of an extraction force 72 caused by a fastening force 73, the insert nut is pulled and moved while damaging the resin substrate 55 by the locking unit (6 and 11) such as the knurled portions, and the flange end portion 16 abuts against the dish portion of the screw 57.

In this state, the locking unit such as the knurled portions has no holding force, and hence the screw may easily fall out together with the insert nut and the member 68 to be fastened as a thin plate in a moving direction 74 due to the extraction force. Further, after the M4 insert nut was thermally press-fitted into a resin material ABS, an extraction force was measured at each torque by screw fastening, and the difference in effects between the example and the comparative example was studied. The thickness of the resin material as the member to be fastened was set to 2 mm.

The flange diameter of the insert nut 1 according to the comparative example was set to 6.5 mm, while the flange diameter of the insert nut 1 according to the example was set to 10 mm. Other conditions were set to be the same. According to the comparative example, when the screw tightening torque was 1.80 Nm (about 18.35 kgfcm), the insert nut was not jacked up from the resin substrate. Then, when the screw tightening torque was 2.0 Nm (about 20.39 kgfcm), such a tendency that the insert nut was jacked up, and the screw was loosened (the screw loosening torque was reduced) was observed.

The reason why the screw is loosened may be considered as follows. In the related art, an extraction force is always generated onto the insert nut during screw fastening due to the difference between the flange diameter of the screw and the flange diameter of the insert nut. The extraction force causes a slight backlash in a direction of pulling out the insert nut from the substrate in response to the difference in heat shrinkage caused at the joined portion between the metal insert nut and the resin substrate when the temperature is changed in the environment in which the insert nut is placed. As a result, it is considered that the screw moves in a direction of separating from the material to be fastened, which causes loosening of the screw.

On the other hand, in the configuration according to the example, no jack-up was observed even when the screw tightening torque was increased up to 2.51 Nm (about 25.59 kgfcm), and the reduction in the loosening torque of the screw was not observed. The performance was improved because jack-up did not occur. Further, the flange of the insert nut is wider as compared to that in the related art, and hence the area of the top surface increases, which reduces the load to be applied per unit area. Therefore, in the related art, a recess of about 0.15 mm was generated in the member to be fastened having an elongate circular hole formed therein even when the screw tightening torque was 1.8 Nm (about 18.35 kgfcm). In contrast, according to the example, even when the screw tightening torque was increased from 1.8 Nm to 2.51 Nm, no recess was generated in the member to be fastened. Further, even when the screw was repeatedly refastened, it was possible to suppress deformation of the member to be fastened.

[Method of Press-Fitting Insert Nut]

A method of mounting the insert nut 1 into a resin component by thermal press-fitting will be described. Thermal press-fitting refers to the following method. The insert nut is set to high temperature, in other words, temperature that can melt the mating resin, and an appropriate biasing force is applied with a jig, to thereby insert the insert nut while melting the hole portion of the mating resin component with heat. That is, thermal press-fitting refers to a method of press-fitting the insert nut into the substrate made of a resin while applying heat.

In the example, a brass plate is used as the material of the insert nut 1. As the material of the resin substrate 55, a material obtained by mixing mica into a composite material of PC-AS (DN1530B produced by Teijin Chemicals Ltd.) was employed. The temperature of the heater was set from 180° C. to 200° C., and a stainless-steel heater having a diameter of 25 mm was used so that the heater was able to sufficiently withstand high-speed inserting. The heater was configured so that sufficient heating was possible with 200 W, and the supply amount of heat was able to be maintained constant through temperature control.

Figure 9:
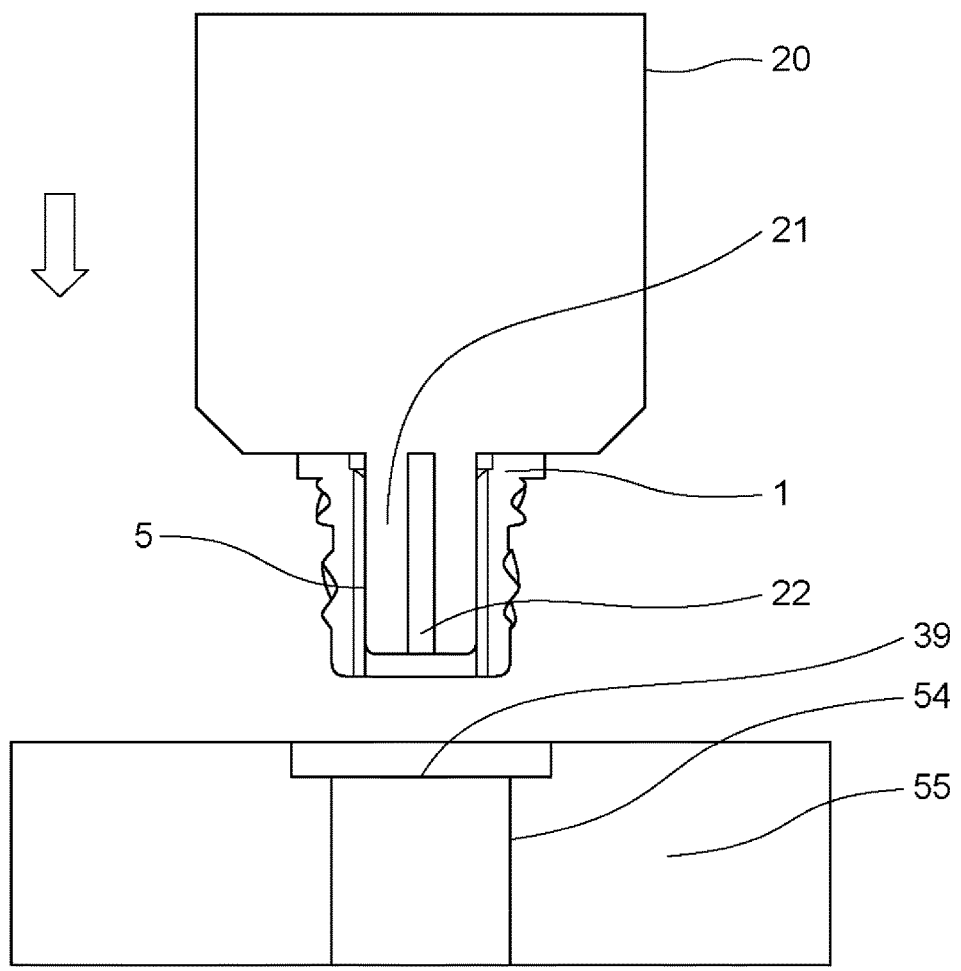
FIG. 9 is a vertical sectional view in which the insert nut is set to a jig.
Figure 10:
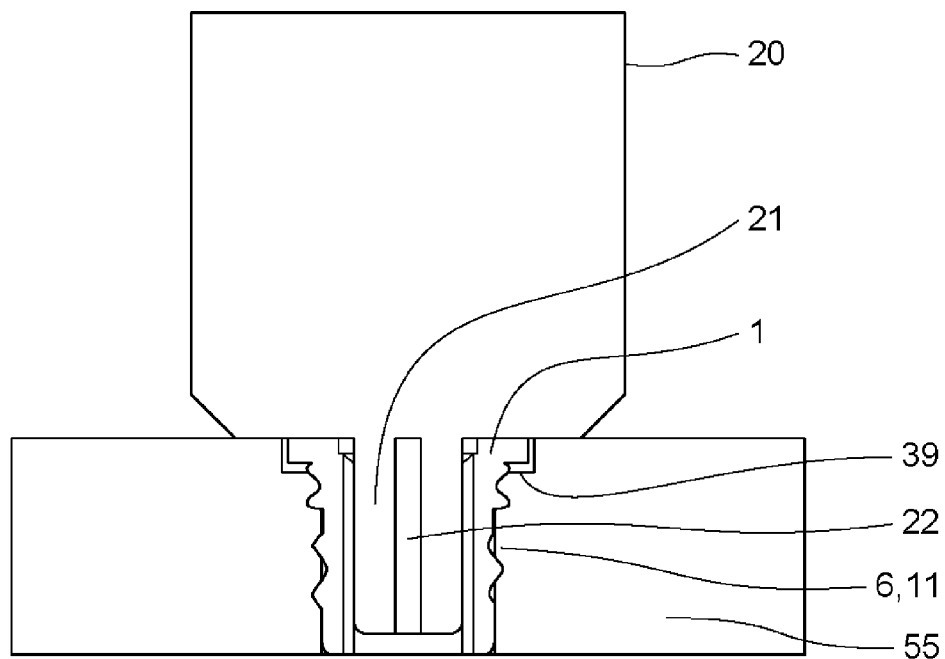
FIG. 10 is a vertical sectional view illustrating a state in which the insert nut is thermally press-fitted.
Figure 11:
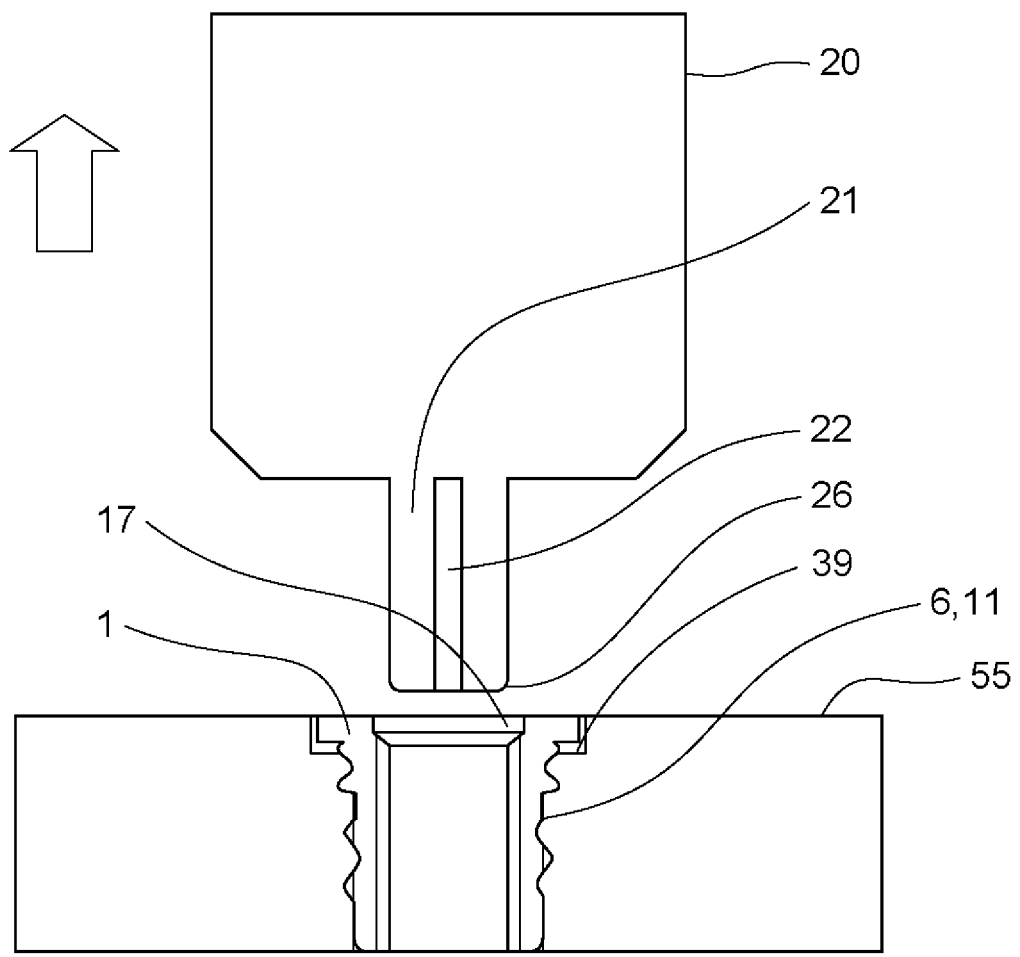
FIG. 11 is a vertical sectional view illustrating a separation state after the insert nut is thermally press-fitted.

FIGS. 9 to 11 are sectional views illustrating a state in which the insert nut is set into a heater 20 so as to be thermally press-fitted into a mating resin component. FIG. 9 is a vertical sectional view illustrating a state in which the insert nut 1 is set to a set guide 21 before heat welding is carried out. FIG. 10 is a vertical sectional view illustrating a state in which the insert nut is thermally press-fitted. FIG. 11 is a vertical sectional view illustrating a state in which the set guide is separated after the insert nut is thermally press-fitted.

In FIG. 9, the insert nut 1 is fitted to the set guide 21 extending in a columnar shape from the heater 20. A groove portion 22 is formed in the set guide 21 so as to obtain an elastic force. The internal thread 5 on the inner diameter side of the insert nut 1 is fitted to the set guide 21 so that the insert nut 1 is heated while being held by the elastic force of the set guide 21. In the press-fitting direction, the substrate (resin component) 55 made of a resin is provided as a member into which the insert nut is inserted, and the heater 20 is lowered toward the mounting hole 54.

FIG. 10 illustrates a state in which the heater 20 is lowered so that the insert nut 1 reaches a defined position.

Further, in FIG. 11, the insert nut 1 thermally press-fitted inside the resin component 55 is cooled as appropriate, and the knurled portions are fixed so as to bite into the resin component 55. With this, when the heater 20 is raised, the biting force exceeds the holding force between the set guide 21 and the internal thread portion 5, and thus the insert nut 1 is separated from the set guide 21. Note that, a peripheral edge portion at the leading end of the set guide 21 is formed into a rounded shape 26. With the rounded shape 26 and the stepped portion (counterbore) 17 formed in the upper part of the internal thread portion 5 of the insert nut 1, the insert nut 1 is set and mounted to the jig while being smoothly guided.

[Method of Manufacturing Insert Nut]

Next, a method of manufacturing an insert nut will be described below.

In the related art, a wide-flanged insert nut has been generally known to be manufactured by lathe cutting of a round bar. However, in the case of the present invention, a stepped portion between the knurled portion and the flange outer shape is required to be removed by cutting. Therefore, as the flange is widened, the amount of cutting for removal is increased, which leads to increase in processing time. Therefore, there have been problems in that the productivity is wastefully reduced and the material is wastefully consumed. In view of this, the present invention can be achieved by an insert nut formed by progressive pressing, which is less wasteful.

The insert nut according to the example is manufactured by pressing. First, the summary of the pressing will be described.

A sheet coil material (hoop material) is used as the material, which is supplied by an uncoiler. The uncoiler is one of a number of peripheral devices of a press machine to be used in pressing (plastic working) of a metal product or component. Specifically, when a coil material is used as a material to be subjected to pressing, in order to supply the coil material to the press machine, the uncoiler unwinds the coil material from the outer side while supporting the coil material with a mandrel.

Next, the strain of the hoop material is corrected by a leveler, and the hoop material is continuously supplied by a roll feeder or the like.

A leveler feeder is one of a number of peripheral devices of the press machine, and is a feeding device in which a function of feeding a sheet material with the rotational and frictional force of rolls is integrated to the device (roller leveler) for correcting the strain by passing the sheet material between the rolls.

The roller leveler is one of a number of peripheral devices of the press machine, and is a device for correcting the strain and warpage of the workpiece (sheet material) by rolling the sheet material while nipping the sheet material between the rolls. A coil material is used as the material, which is fed by a sheet loader. The sheet loader is one of a number of peripheral devices of the press machine, and is a device for feeding the sheet material (sheet), which is a raw material (material) to be subjected to pressing, one by one for pressing. With those devices such as the leveler, the roll feeder, and the leveler feeder, the material is continuously supplied.

The supplied material is subjected to pressing by a pressing unit that uses a progressive press die. A plurality of steps are prepared in order at equal pitches (channels) inside a single die. With the feeding device, one pitch (one channel) is fed for each rotation of the press machine so that the material is fed in sequence to the next step. The material is continuously supplied through automatic continuous operation, and is often lined out as a pressing completed product.

In the pressing process, a large number of steps are carried out in a single die, which is called a progressive press die. A band-shaped strip sheet material, which is the hoop material, is fed at a contact pitch so as to progress the pressing in order. In a final pressing step, one component is cut out from the hoop material so as to be finished and ejected. Therefore, as compared to the related-art method of preparing a large number of dies and operating the press machine, this method is suitable for stable automatic mass production, and the production is possible efficiently at low cost. Employment of this method enables reduction in the manufacturing cost (component cost) to about half or less the case of lathe processing because, in pressing, the material consumption amount is small, the processing time is short, a cutting oil that requires cost is unnecessary, and a manual chip removal operation is also unnecessary.

The insert nut according to the example is also manufactured with use of this progressive pressing technology, and the insert nut is finally finished by punching out the flange of the top surface from the channel of the hoop material by pressing.

On the back surface side of the top surface 2, a burring is formed through drawing by pressing. Next, the leading end portion is shaped while holding the inner hole with a shaft, and further knurling is carried out. In the next step, the two types of knurled portions are processed by press knurling, to thereby form the first knurled portion 6 and the second knurled portion 11. Further, at this time point, the guide inclined surface 14, the cylindrical portion 4, and the counterbore portion 17 are also similarly formed.

In the next step, tapping is carried out by a hi-roll tap arranged inside the die, and then reaming is carried out to form a highly-accurate thread portion. Further, the matching area of the flange portion is punched out by pressing so as to cut and separate the insert nut from the frame. Thus, the insert nut is completed.

Figure 12:
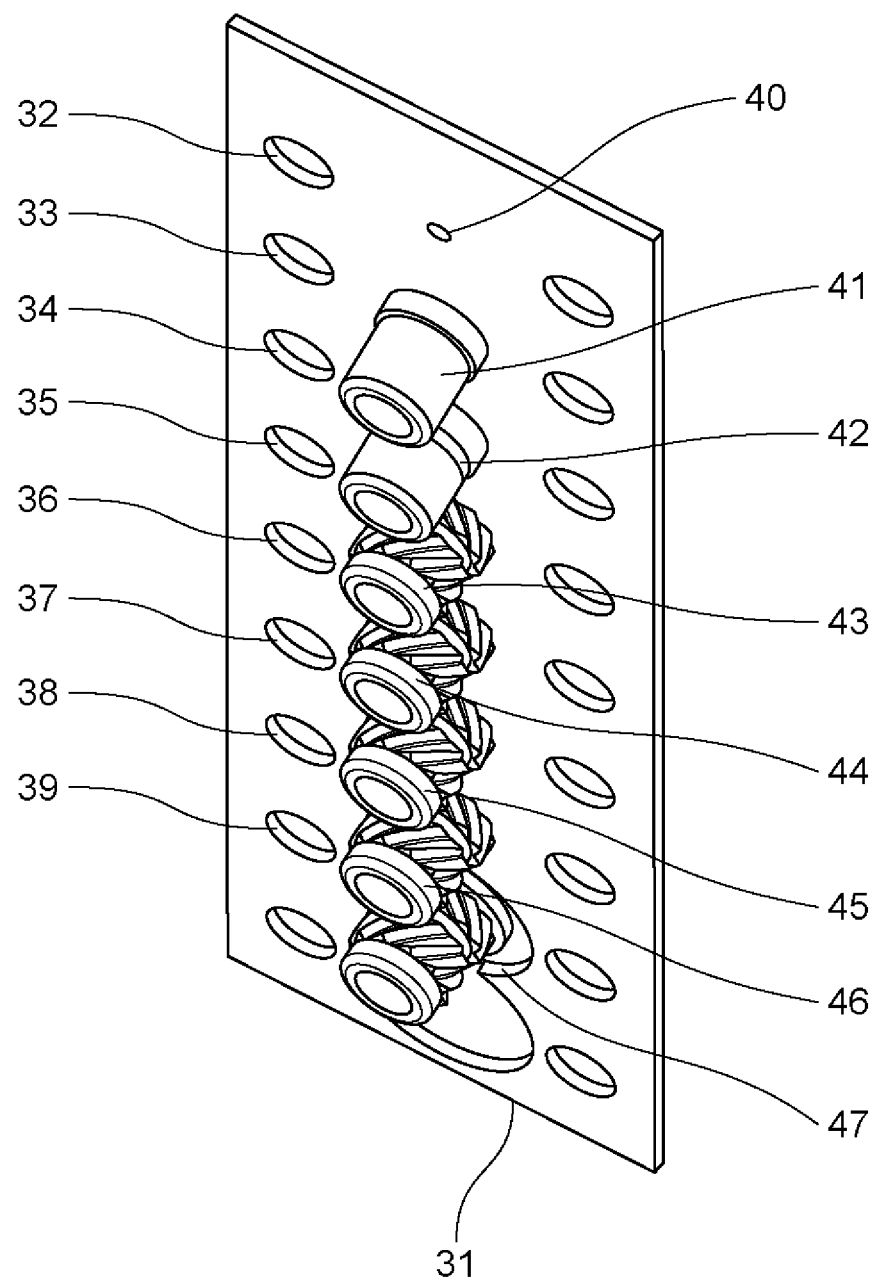
FIG. 12 is a perspective view illustrating a processing process of the insert nut.

FIGS. 12, 14A, and 14B are views illustrating the pressing step when the above-mentioned progressive press die is used for processing the insert nut according to the example.

FIGS. 13A and 13B illustrate insert nut processing through related-art pressing. In a sheet material 31 as the hoop material, holes (32 to 39) are formed at both ends so as to step-feed the sheet material 31 from a first step to a seventh step. Now, description is made on the premise that the respective steps are matched with those holes (channels) as references.

On the other hand, FIGS. 14A and 14B illustrate a pressing state according to the example. In the sheet material 31 as the hoop material, holes (32 to 40) are formed at both ends so as to step-feed the sheet material 31 from a first step to a ninth step. Then, the processing is sequentially progressed by sequentially feeding the sheet material 31 in a manner that the respective steps are matched with those holes (channels) as references.

In the first step, a prepared hole 41 is opened by pressing at a part corresponding to the center portion of the insert nut, which is the center of the burring.

In the second step, the sheet material is subjected to stepped burring so as to form a burring 42 having a cylindrical shape by deep drawing. Depending on cases, the burring may be formed by thickening drawing (not shown) involving swelling the sheet material into a half-moon bowl shape, and then collecting the material to obtain a necessary volume.

In the third step, a groove 43 is formed in an outer peripheral portion.

In the fourth step, a knurled portion 44 is formed in an outer peripheral portion. In general, knurling is possible with use of a commercially-available knurling tool of a type in which a pair of knurling teeth is formed on an outer diameter portion of a rotary roller so as to carry out pressurizing and transferring. In contrast, in the case of the example, a commercially-available product is difficult to be built-in in terms of space and structure. Therefore, uniquely, an internal-gear tool blade with a two-stage structure is arranged on a ring-shaped tool, and this tool is rotationally moved with use of the stroke of the die. Then, the tool is pressed against the outer diameter burring portion of the cylindrical portion of the insert nut, to thereby enable forming of the knurled portion 44. Further, it is possible to similarly form the knurled portion 44 by arranging two-stage horizontal rack blades so as to be opposed to each other, and rotationally moving the blades while sandwiching the burring portion therebetween. At this time, similarly to the third step, in order to prevent deformation of the cylindrical hole formed by burring, a guide pin is mounted into the inner diameter portion. In order to accurately secure the coincidence of the inner and outer diameters, a guide pin whose transition fit tolerance is set with respect to the mating guide is protruded from the die to accurately regulate the position. Thus, the axis is prevented from being misaligned also in the perpendicular direction.

In the fifth step, a counterbore portion 45 is formed in the burring 42 by pressing. In the case of the example, the counterbore portion 45 is formed in order to facilitate, as illustrated in FIGS. 9 to 11, entrance of the set guide 21 of the heater 20 when being guided, and in order to secure accuracy in the later steps.

In the sixth step, the hole of the burring 42 formed in the second step is subjected to reaming 46, to thereby finish the inner diameter to have an accuracy of about 0 to −0.01 mm.

In the seventh step, the burring 42 is subjected to tapping 47 so as to form the internal thread.

Note that, in order to prevent the chips from remaining inside the press die, it is preferred that a roll tap tool be used to form a thread by rolling, which corresponds to plastic deformation processing.

Further, when a precise dimension is required for the prepared hole of the thread, the sixth step may be replaced with the seventh step, or the reaming may be carried out after the seventh step.

In the eighth step, the outer peripheral portion 16 of the flange of the insert nut 1 is punched into a half-moon shape by pressing 48.

Further, in the ninth step, outer diameter punching 49 is carried out so as to cut and separate the matching area from the frame 31 by pressing. With this, the insert nut is completed as one component.

After that, the insert nut cut and separated from the hoop material is subjected to, as appropriate, steps such as degreasing and cleaning, a plating step, and an inspection step to finally be finished as a product.

In the related art illustrated in FIGS. 13A and 13B and the example illustrated in FIGS. 14A and 14B, the holes (32 to 40) for carrying out step-feeding from the first step to the ninth step are formed at both ends. In the related art, the step-feeding has been carried out while arranging the processing center of the insert nut and the holes (channels) on both sides at the same position in the traveling direction. However, a wide top surface is necessary in the example, and hence the diameter of the flange 3 is increased. A pitch dimension 50 indicated in FIG. 14A is accordingly automatically increased by the diameter difference. Therefore, the cutting layout is deteriorated, and the number of components to be obtained is reduced. In view of this, a channel pitch dimension 51 is shifted by half a pitch.

Further, the diameter of the channel of 3 mm in the related-art is reduced to 2 mm so that a channel width dimension 52 is narrowed as much as possible at the ejection position that remains after punching of the half-moon shape. As a result, a width dimension 53 of the hoop material 31 was able to be narrowed. As a result, the number of components to be obtained per constant area was able to be increased. That is, even when the diameter of the flange was increased, the material was able to be entirely used without waste, and hence, a large effect of preventing an increase in cost was achieved.

The insert nut formed through the above-mentioned steps was tested as follows. Note that, the insert nut used here had the following specification. Brass was used as the material. The dimension in the press-fitting direction was 5 mm for the entire length, was L=1.5 mm for the second knurled portion 11, and was L=1.0 mm for the first knurled portion 6. Further, the length in a direction orthogonal to the press-fitting direction was 5.5 mm for the flange portion 3, was 4.0 mm for the second knurled portion 11, and was 5.0 mm for the first knurled portion 6. Further, the depth of the root 6b was 0.60 mm. Further, the curvature radius of the rounded shape of the root 11b of the second knurled portion 11 was 0.10 mm, and the curvature radius of the root 6b of the first knurled portion 6 was 0.40 mm.

Such an insert nut was thermally press-fitted into a mating plastic material PBT of Crastin, model number HTI666FR, produced by Du Pont Japan, Ltd., and was subjected to an M3 screw tightening torque test. As a result, although a general tightening reference force was 8 kgfcm, no problem occurred up to 16 kgfcm, and the insert nut was able to withstand the tightening torque finally until the iron screw itself had its head portion or shank portion broken. No change was observed in the heat press-fitted part between the insert nut and the mating plastic. Similar tendency was able to be observed also in PPE+PS, model number NORYL PX2790J produced by Saudi Basic Industries Corporation, or PET, model number 3406NH produced by KANEKA CORPORATION.

The related-art insert nut 1 is generally formed with use of free-cutting brass or free-cutting steel. In the case of the present invention, the shape is formed by pressing, and hence cold forging and rolling technology are rather used. Therefore, it is relatively easy to use a processing resistant material having high viscosity, such as a brass sheet (BSP), an iron sheet (SPCC-SD), and stainless (SUS304CSP). Further, aluminum (A5052R) may be used as another material of the insert nut. Advantages of using an aluminum material include a small specific heat ratio and good heat conductivity. Therefore, the heat of the heater 20 is easily transmitted to the insert nut 1, and hence the heat capacity is small and the heating time is shortened. Further, an aluminum material has excellent ductility, and hence is suitable for minute press forming. Further, the thread portion and the knurled portion may be increased in strength by carrying out work hardening or surface hardening processing such as anodizing.

In the case of a metal such as aluminum, crystal slip occurs when a stress is applied to the metal, and a resistance against this slip plane gradually increases. When this resistance increases to some extent, plastic deformation occurs in which the slip is sequentially moved to another surface. As the deformation progresses by the cool processing, the resistance and the hardness increase. This refers to work hardening.

Further, the work hardening coefficient is a characteristic value that gives an indication of drawing performance, and is called an "n value". The work hardening coefficient refers to an index n when the relationship between a stress $\sigma$ and a stain $\varepsilon$ in a plastic region representing a yield point or more is approximated by $\sigma = C\varepsilon^n$. As this n value increases, the drawing performance is increased because the extension until occurrence of local contraction is large. In general, the n value is about 0.15 to 0.45. There is a remarkable difference between 0.27 of aluminum, which is a typical soft metal, and 0.50 of 18-8 stainless, which is a hard metal.

In the example, the internal thread 5 is processed by a roll tap so as to carry out tapping without generation of chips. When aluminum is used in such a case, by simultaneously carrying out work hardening, the strength of the ridge can be increased. Similarly, also in the outer peripheral knurled portions, the strength of the raw material was able to be increased by work hardening. Therefore, by carrying out pressing of aluminum that may be greatly reduced in cost per unit volume than stainless steel and brass, also considering the difference in specific weight, the performance was able to be effectively derived. Further, it is possible to carry out surface processing such as anodizing and hard anodizing as necessary. Therefore, proper usage is possible by, for example, coloring the surface so as to visually represent the order of the various thread portions or the types of the screws to be used. Further, it became possible to provide the insert nut capable of sufficiently withstanding screw fastening that required high rigidity, or repeated fastening or installing and removing of the screw.

Embodiment 1

Next, an image forming apparatus to which the insert nut according to the example is applied will be described.

[Image Forming Apparatus]

FIG. 15 is a schematic sectional view illustrating the overall image forming apparatus. A process cartridge and a sheet cassette, which use the insert nut according to the example, and the image forming apparatus including those members are described.

FIG. 15 is a sectional view illustrating a schematic configuration of an image forming apparatus 100. In FIG. 15, photosensitive drums 110a, 110b, 110c, and 110d serve as image bearing members corresponding to four colors of yellow, magenta, cyan, and black, respectively. Around the photosensitive drum 110a, a charging device 120a configured to uniformly charge the surface of the photosensitive drum, and an exposure device 130 configured to project laser light modulated based on image information to be recorded on a charged surface of the photosensitive drum are provided. Further, a developing device 140a configured to develop a latent image formed on the surface of the photosensitive drum by the laser light projected from the exposure device 130, and a photosensitive drum cleaning device 150a configured to remove and collect toner remaining on the surface of the photosensitive drum 110a are arranged. The configurations around the photosensitive drums 110b, 110c, and 110d other than the photosensitive drum 110a are similar to those for the photosensitive drum 110a except that the color of the toner to be used and the irradiation position of the exposure device 130 differ. The photosensitive drum 110, the charging device 120, the developing device 140, and the cleaning device 150 are integrated for each of the colors, and construct each of process cartridges P (Pa, Pb, Pc, and Pd).

Above the photosensitive drum 110, an intermediate transfer belt 160 onto which the toner image on the photosensitive drum 110 is transferred is arranged. On the inner side of the transfer belt 160, primary transfer rollers 170a, 170b, 170c, and 170d are arranged at positions opposed to the respective photosensitive drums. Around the transfer belt 160, an intermediate transfer belt cleaning device 180 configured to collect the toner remaining on the surface of the intermediate transfer belt 160 is arranged.

On the opposite side to the intermediate transfer belt cleaning device 180 across the transfer belt 160, at a position opposed to the intermediate transfer belt 160, a secondary transfer roller 190 is arranged. A recording medium P fed from a feeding device 200 is conveyed to a transfer position between the intermediate transfer belt 160 and the secondary transfer roller 190. On the downstream side in the conveyance direction with respect to the transfer position, a fixing device 210 and a delivery tray 220 are arranged.

An operation of the image forming apparatus 100 described above is controlled by a controller 230. The toner collected by the cleaning device 150 and the intermediate transfer belt cleaning device 180 are discharged to a toner collection box 300 arranged on the front side of the image forming apparatus.

[Image Forming Process]

Next, an operation of the image forming apparatus is schematically described. The photosensitive drum 110 rotates at a constant speed in the direction indicated by the arrow A by a driving device (not shown). The surface of the photosensitive drum 110, which is uniformly charged by the charging device 120, is projected by the exposure device 130 with laser light modulated based on the image information to be recorded, to thereby form a latent image. The latent image formed on the photosensitive drum 110 is developed by toner loaded inside the developing device 140, to thereby form a toner image.

When the photosensitive drum 110 is rotated in the direction indicated by the arrow A so that the toner image on the photosensitive drum 110 comes to a primary transfer position for the intermediate transfer belt 160, the toner image is transferred onto the intermediate transfer belt 160 due to the action of the primary transfer roller 170. The residue toner on the photosensitive drum 110, which has not been transferred at the primary transfer position, is collected by the cleaning device 150. The surface of the photosensitive drum 110 is cleaned to prepare for the next image formation. The collected toner is discharged into the toner collection box 300.

The intermediate transfer belt 160 is rotated at a constant speed in the arrow B direction by the driving device (not shown). In synchronization with the timing at which the toner on the intermediate transfer belt 160 comes to a secondary transfer position due to this rotation, the recording medium is fed from the feeding device 20. At the secondary transfer position, the toner image is transferred onto the recording medium due to the action of the secondary transfer roller 190. The residue toner on the intermediate transfer belt 160, which has not been transferred at the secondary transfer position, is collected by the intermediate transfer belt cleaning device 180, and the surface of the intermediate transfer belt 160 is cleaned to prepare for the next image formation. The collected toner is discharged into the toner collection box 300.

The recording medium having the toner transferred thereon is subjected to fixing processing by the fixing device 210, and is delivered onto the delivery tray 220.

[Process Cartridge]

The process cartridge P according to the embodiment is configured so that an image forming unit of the electrophotographic image forming apparatus 100 illustrated in FIG. 15 is accommodated into a cartridge casing so as be removably mountable onto the apparatus. Now, an intermediate transfer system is given as an example, in which the process cartridges Pa, Pb, Pc, and Pd of the respective colors of yellow (Y), magenta (M), cyan (C), and black (Bk) are arranged side by side with respect to the transfer belt 160.

The process cartridges of the respective colors include the photosensitive members 110*a* to 110*d*, respectively. Further, the process cartridges include charging devices 120*a*, 120*b*, 120*c*, and 120*d*, the cleaning devices 150*a*, 150*b*, 150*c*, and 150*d*, and the developing devices 140*a*, 140*b*, 140*c*, and 140*d*, which serve as process units. Note that, in this case, an integrated cartridge including even the developing device is obtained, but the photosensitive member or any arbitrary one of the process units may be removably mountable to the cartridge. For example, a cartridge in such a mode that the developing device is absent may be obtained.

FIGS. 16 to 19 illustrate the process cartridge to be used in the image forming apparatus.

Figure 16:
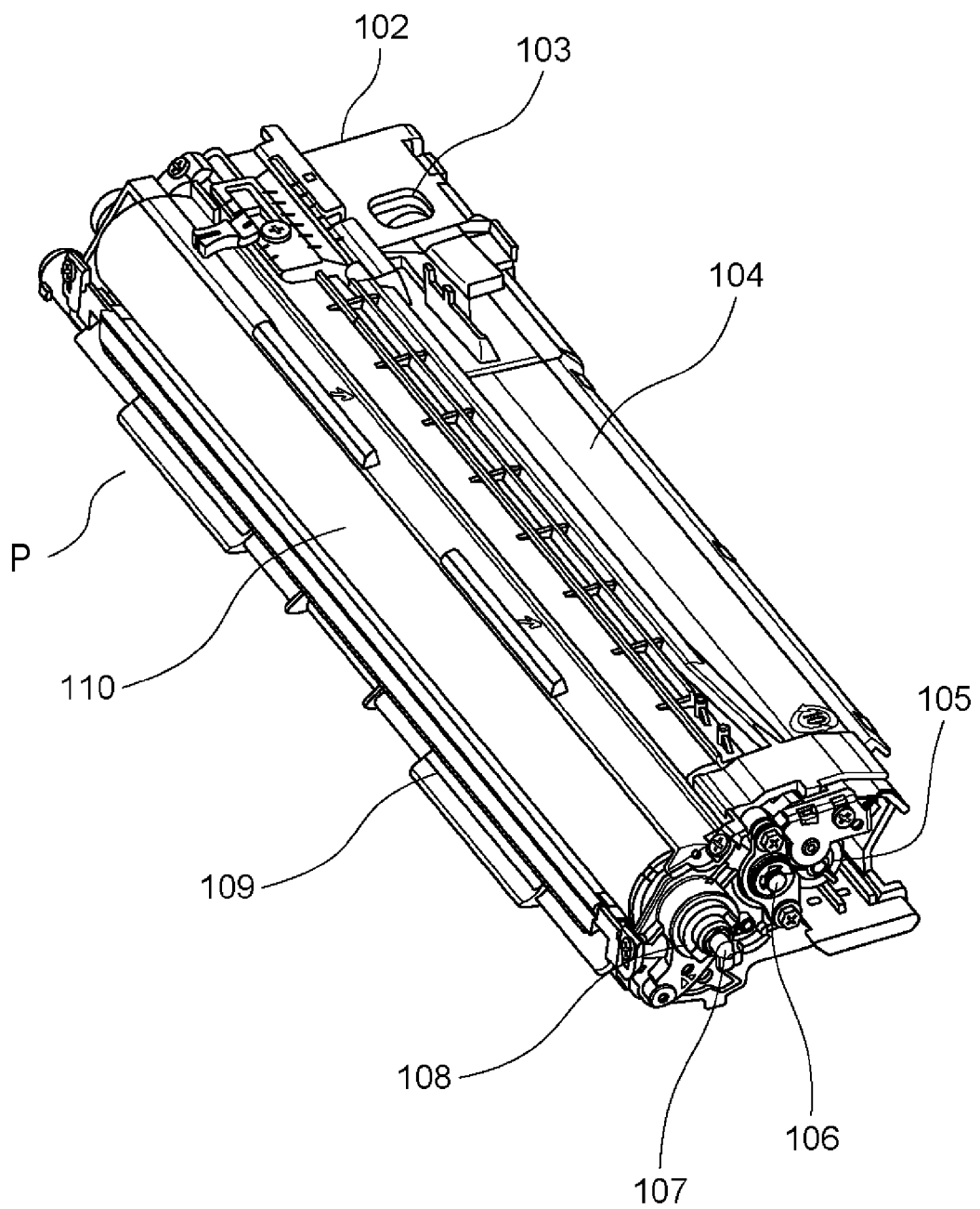
FIG. 16 is a perspective view of a process cartridge to be used in the image forming apparatus.

FIG. 16 is a perspective view of a process cartridge P to be used in the image forming apparatus. In the external appearance, an upper housing 104, and a toner supplying portion 103 formed at a longitudinal end portion of a lower housing 109 are arranged. A shutter 102 is formed so as to be opened and closed when the process cartridge P is removed from and mounted on the image forming apparatus. On the longitudinal side surface, the photosensitive drum 110 serving as an image bearing member is supported by a drum shaft 107 so as to be rotated. The photosensitive drum 110 is rotated at a certain process speed with a coupling 108 by a drive force from a drive unit of an image forming apparatus main body. Note that, the drive force is also transmitted to a developing roller shaft 106 by a gear train 105.

Figure 17A:
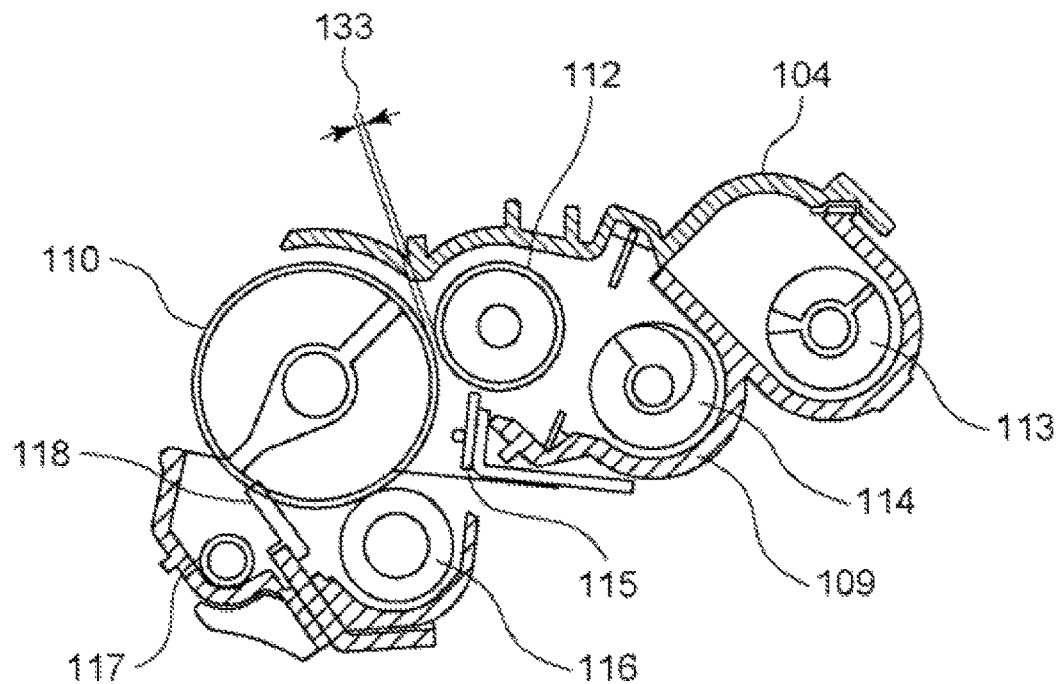
FIG. 17A is a lateral sectional view of the process cartridge.
Figure 17B:
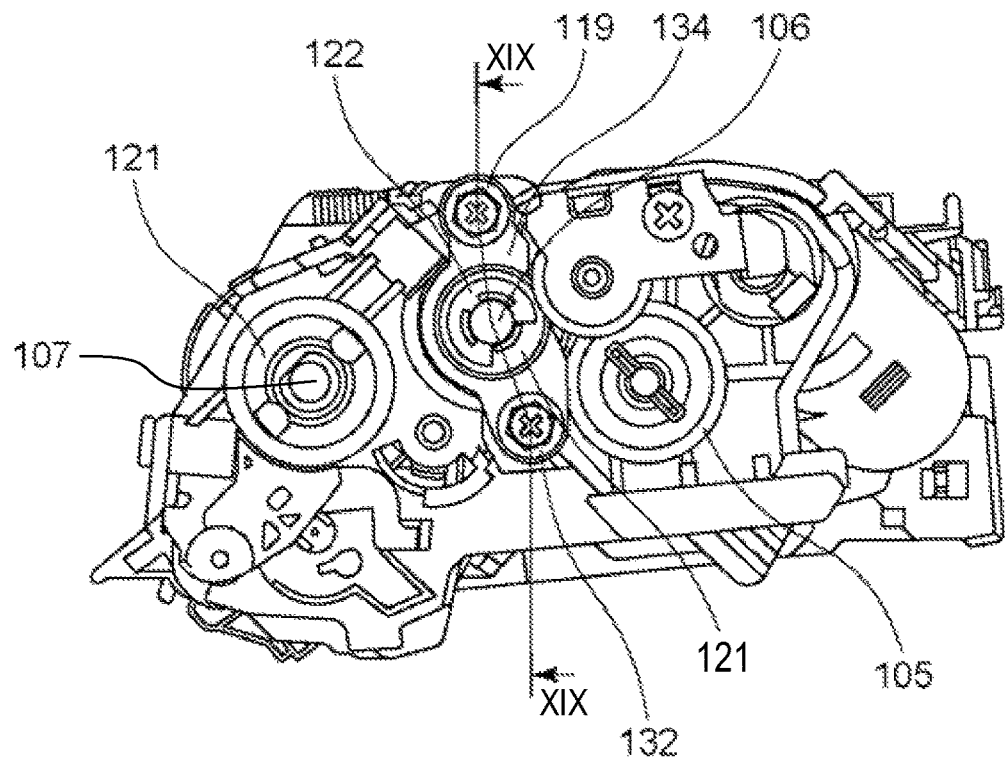
FIG. 17B is a side view of the process cartridge.

FIG. 17A is a lateral sectional view of the process cartridge, and FIG. 17B is a side view of the process cartridge.

Screws 113 and 114 arranged inside the developing device stir carriers and toner serving as developer. The stirred developer is supplied to a developing sleeve 112 serving as a developer carrying member, and the amount of the developer is regulated by a D blade 115. Thus, the toner is supplied to the latent image formed on the photosensitive drum 110 so as to visualize the image.

On the surface of the photosensitive drum 110, which is charged by a charging roller 116, a latent image is formed by light from the laser scanner.

The toner image developed by the developing device is transferred onto the intermediate transfer belt. A cleaning blade 118 abuts against the surface of the photosensitive drum 110 so as to remove the transfer residue toner remaining on the surface of the photosensitive drum 110. The removed toner is supplied to a toner collection bottle by a toner collection screw 117.

A highly-accurate and narrow gap is formed between the photosensitive drum 110 and the developing roller 112. In this gap, the positively-charged toner is attracted to the negative potential of the photosensitive drum. This gap is called an S-D gap 133, and is set to about 0.3 to 0.5 mm. For securing image quality, it is necessary to maintain the tolerance of the S-D gap to be accurate as 0.03 to 0.05 mm.

Figure 18:
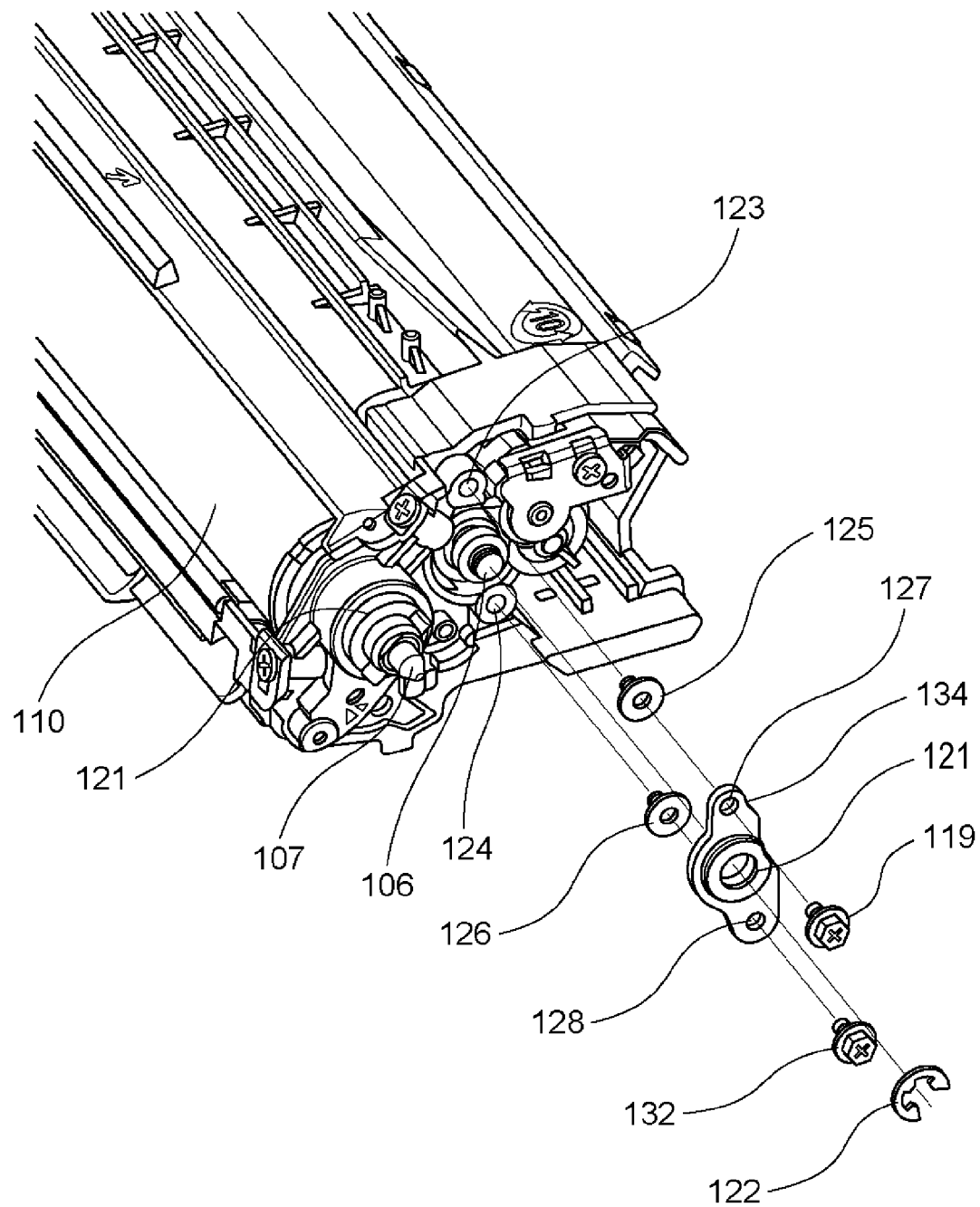
FIG. 18 is an exploded perspective view of an end portion of the process cartridge.

FIGS. 17A, 17B, and 18 are a sectional view, a side view, and an exploded perspective view, respectively, of the process cartridge. The photosensitive drum 110 and the developing roller 112 are both rotatably supported by a bearing 120 so as to obtain a smooth rotation. Further, in order to adjust the position of the S-D gap, a developing roller bearing support member 134 for holding the bearing 121, and screws 119 and 132 provided on both sides thereof are arranged.

This process cartridge supports both manual assembly work and assembly by an automatic machine. The lower housing 109 has prepared holes 123 and 124 formed therein, and insert nuts 125 and 126 according to Example 1 are thermally press-fitted therein. After that, the bearing 121 is fitted onto the developing roller shaft 106 while positioning adjustment fixing holes 127 and 128 on both sides of the developing roller bearing support member 134, and the developing roller bearing support member 134 is temporarily fixed with the screws 119 and 132 and held with an E-ring 122. The screws 119 and 132 are the same as those described in Example 1.

Under this state, the S-D gap is measured with use of a gauge or a laser light beam, and the gap is adjusted so as to obtain the defined S-D gap 133 within a range of the gap of each of the adjustment fixing holes 127 and 128 having larger hole diameters than the diameters of the screws 119 and 132, respectively.

Figure 19:
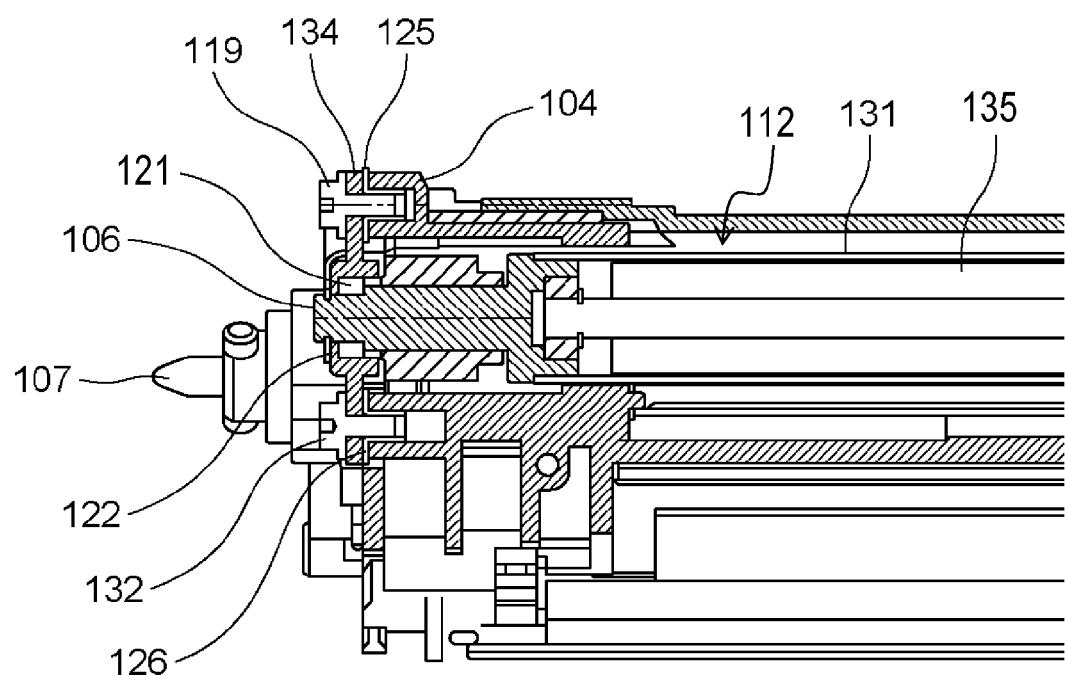
FIG. 19 is a partial vertical sectional view of the process cartridge having insert nuts mounted thereon according to Embodiment 1.

FIG. 19 is a partial vertical sectional view of the process cartridge having the insert nuts mounted thereon, and illustrates a cross section taken along the line XIX-XIX of FIG. 17B. The developing roller 112 is a roller coaxially including a magnet 135 and a sleeve 131, and the end portion of the developing roller is supported by the bearing 121. The developing roller bearing support member 134 serving as the member to be fastened is made of a hard resin reinforced by glass fibers or the like, and is fastened to the insert nuts 125 and 126 made of brass. In order to suppress the jack-up due to the bending of the member to be fastened during screw fastening, the bending strength of the material to be fastened is preferred to be 650 kgf/cm$^2$ or more. The bending strength can be measured with reference to ISO178. The effects of the present invention can be obtained as long as the flange diameter of the insert nut is within a range defined in the present invention.

Particularly in the case of the automatic machine, screw fastening is carried out by automatically measuring the S-D gap 133, and simultaneously adjusting the position by a robot hand. However, when the S-D gap 133 is out of specification after the screw fastening, a feedback control of measuring the amount of misalignment and loosening the screws 119 and 132 so as to refasten the screws 119 and 132 is carried out to finally set the S-D gap 133 within the specification. Therefore, the screws are repeatedly fastened and loosened at high speed.

When the screw fastening is repeated directly on the lower housing 109 by using a tapping screw or the like, the ridge of the resin is damaged, and the thread comes out of order. Therefore, it is suitable to use the insert nut. Further, with use of the insert nut according to the example, a pulling-out force does not strongly act on the insert nut, and defects caused thereby can be suppressed. Further, with use of the insert nut 1 according to Example 1, the receiving surface of the developing roller bearing support member 134 is enlarged. Therefore, it is possible to prevent deformation and damage on the resin portion. As a result, although the related-art insert nut required a repetitive work of about 40 times, with use of the insert nut according to the example, the effect of reducing the repetitive work to about 10 times or less was obtained. The reason is as follows. The flange diameters of the insert nuts 125 and 126 are large, and hence the contact pressure per unit area is reduced. Therefore, a fastening mark is not generated on the developing roller bearing support member. Therefore, the flat surface is maintained, and thus a minute positional adjustment in micron order is facilitated. With this, the production efficiency was improved.

Embodiment 2

FIGS. 20, 21A, 21B, 22A, and 22B illustrate a case in which the M4 insert nut according to the example is applied to the sheet cassette of the image forming apparatus.

Figure 20:
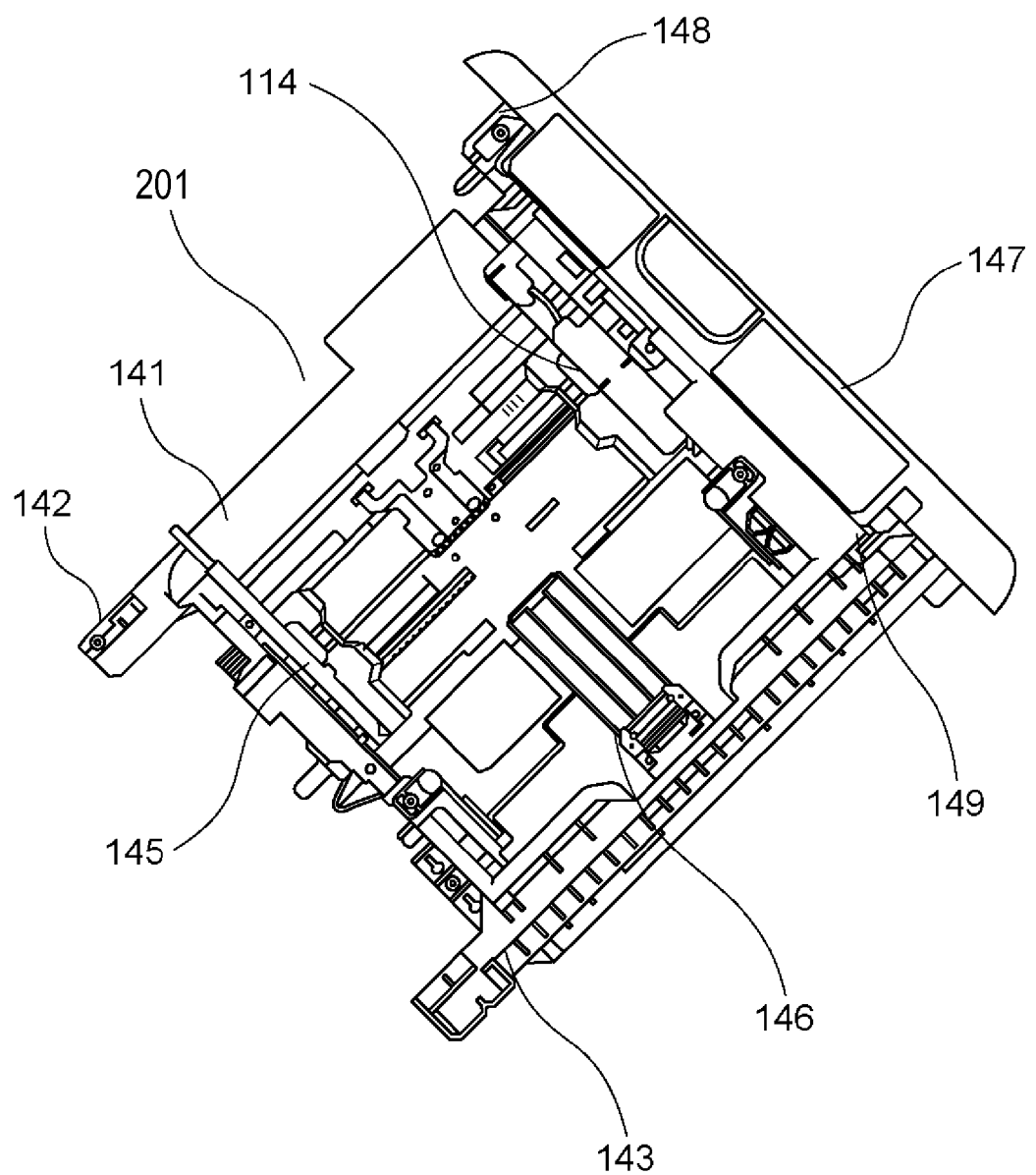
FIG. 20 is a perspective view of a sheet cassette to be used in the image forming apparatus.
Figure 21A:
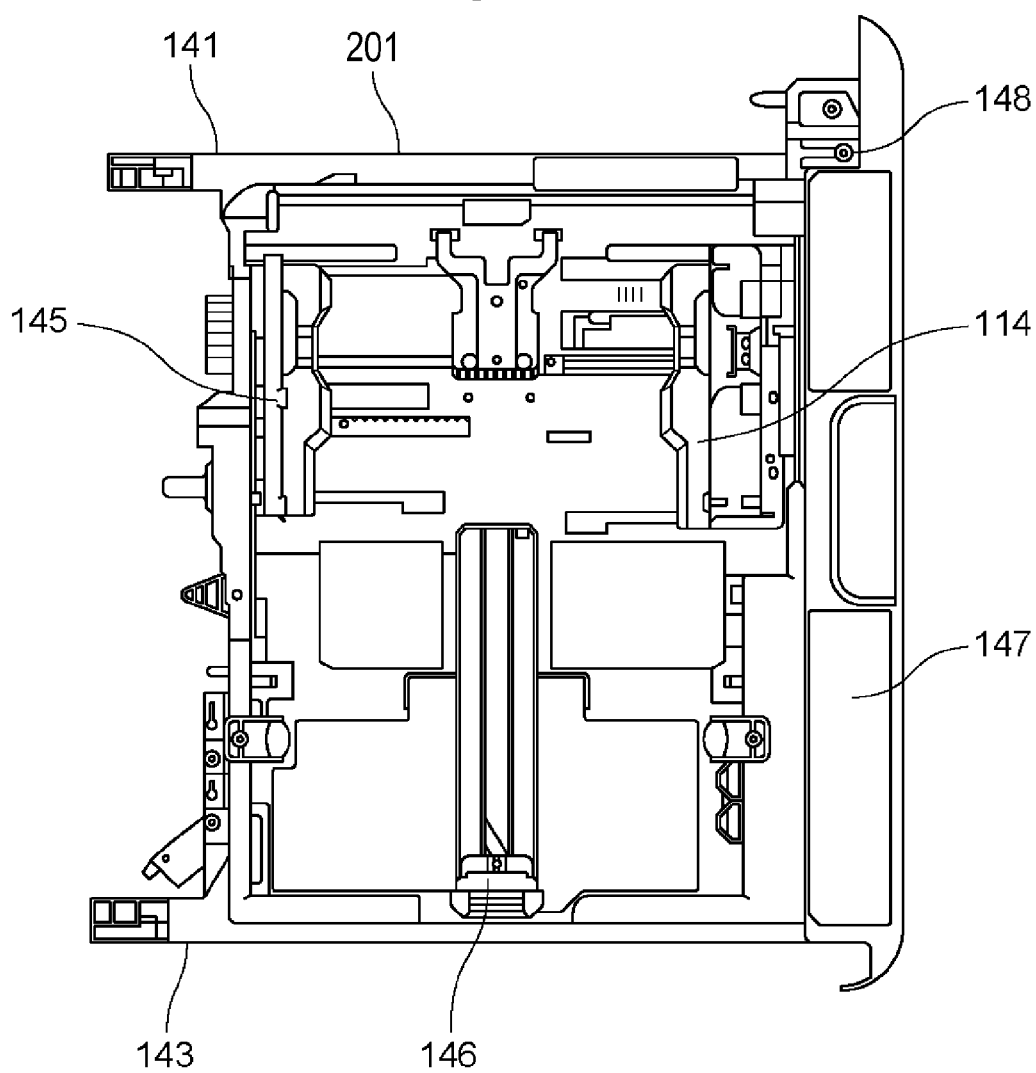
FIG. 21A is a plan view of the sheet cassette.
Figure 21B:
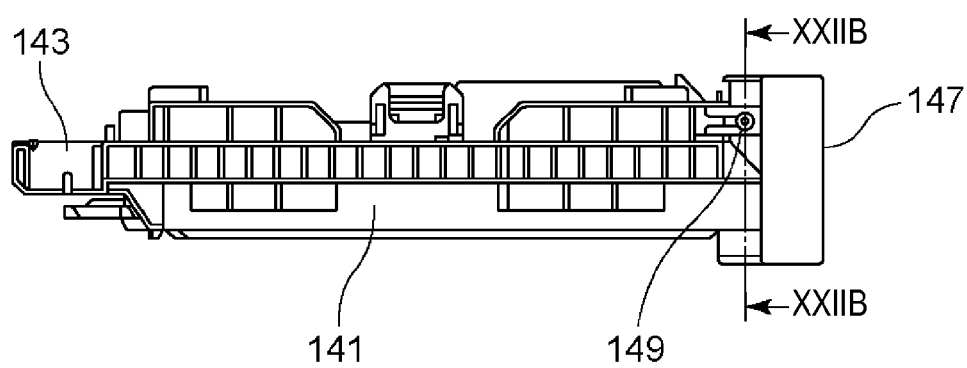
FIG. 21B is a side view of the sheet cassette.
Figure 22A:
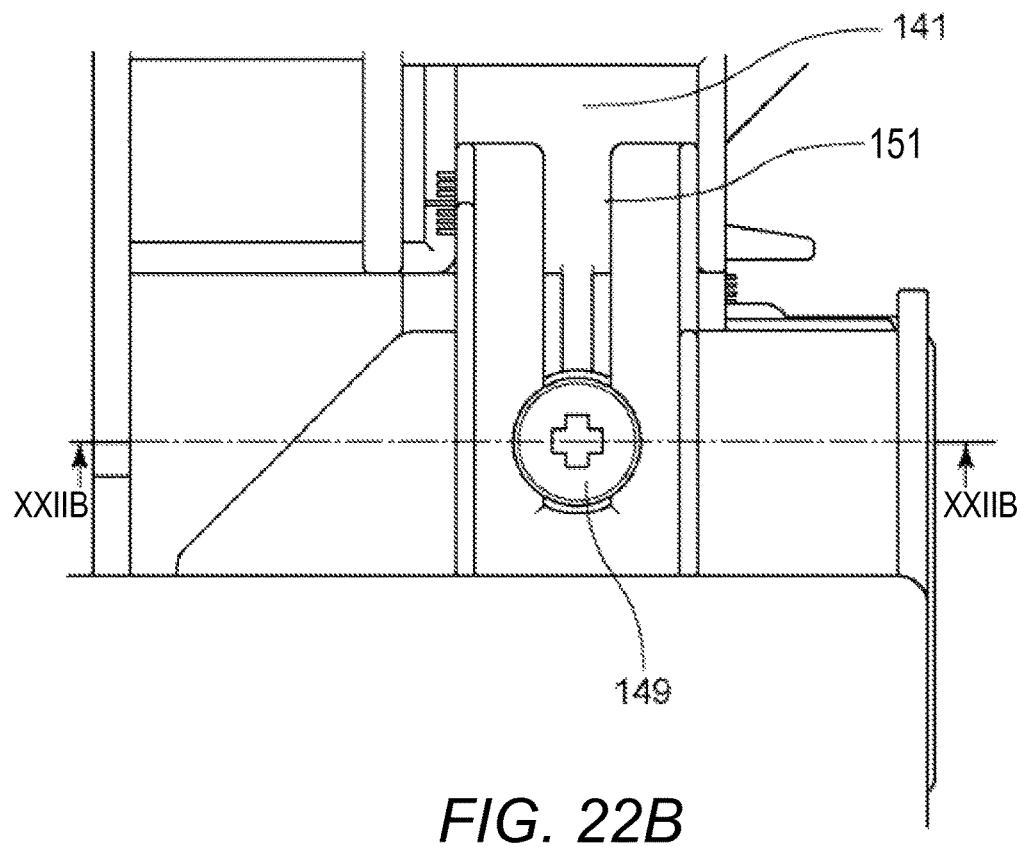
FIG. 22A is a plan view illustrating a screw fastening state according to Embodiment 2 of the present invention.
Figure 22B:
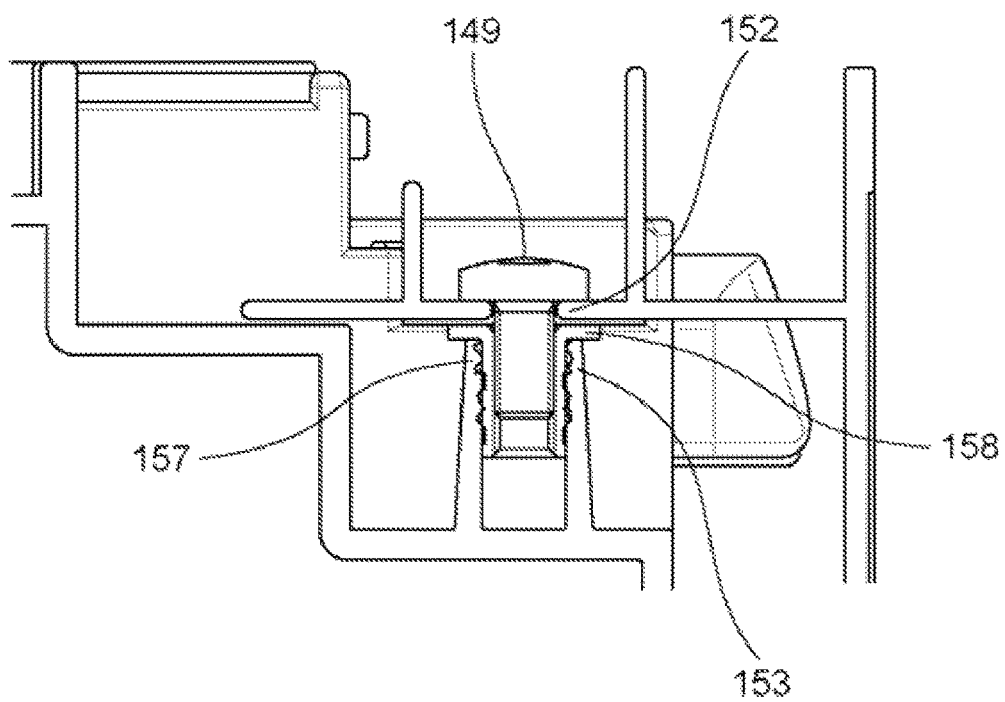
FIG. 22B is a sectional view taken along the line XXIIB-XXIIB of FIGS. 21B and 22A.

FIG. 20 is a perspective view of the sheet cassette to be used in the image forming apparatus, FIG. 21A is a plan view of the sheet cassette, and FIG. 21B is a side view of the sheet cassette. FIG. 22A is a plan view illustrating a screw fastening state of the embodiment, and FIG. 22B is a sectional view illustrating the screw fastening state of the embodiment. FIG. 22B illustrates a cross section taken along the line XXIIB-XXIIB of FIG. 21B and FIG. 22A.

FIGS. 20, 21A, and 21B illustrate the entire sheet cassette 201. The sheet cassette 201 includes a box-shaped cassette case 141 serving as a base. In the cassette case 141, a right rail 142 and a left rail 143 are integrally formed and arranged. Those rails enable the sheet cassette to be freely removed and inserted so as to be compatible with a sheet feeding portion of the image forming apparatus main body, to thereby supply the sheets. In order to set the sheets so as to accurately match with the sheet feeding position when the sheets are supplied and loaded, side regulating plates 114 and 145 for regulating the posture of the sheets are arranged. Further, a trailing edge regulating plate 146 for regulating the trailing edge portions of the sheets is provided. Thus, the regulating plates can be slid and adjusted so as to match with various sheet sizes.

There are known image forming apparatus in which a lateral registration adjusting mechanism is provided in the sheet cassette 201 so that the image writing position center line and the sheet center line match with each other. Particularly in an image forming apparatus including a large number of stages of sheet cassettes, the lateral registration adjustment is carried out individually so as to match with the position of each sheet feeding unit for each cassette stage. Then, front covers 147 as external surfaces become uneven, which is visually undesirable. In view of this, the front cover 147 is separated from the cassette case 141 so as to enable adjustment of the position of the front cover 147 by screw fastening.

In the embodiment, fastening portions are formed on right and left sides of the front cover 147, and the position of the front cover is adjusted by a right adjustment fixing screw 148 and a left adjustment fixing screw 149.

FIGS. 22A and 22B are views illustrating a state in which the front cover 147 is fastened by an insert nut 157. In FIG. 22B, the insert nut 157 is thermally press-fitted into a cylindrical abutment surface 153, and is arranged so that a flange 158 is extended on the upper surface of the cylindrical abutment surface 153. A front cover U-shaped groove 151 of the front cover 147 abuts against the flange 158, and fastening is carried out by the mounting screw 149.

A sufficient abutment area is secured by the wide flange 158 of the insert nut 157. Therefore, the load per unit area is reduced, and the deformation of a portion 152 of the U-groove to be fastened can be suppressed. In addition, the portion 152 is less liable to deform even when the screw tightening torque is increased, and the defects such as jack-up, which have been described in the object of the present invention, can be suppressed. The resin serving as the member to be fastened is not deformed, and hence an effect of facilitating the minute adjustment of the front cover can also be obtained.

According to the embodiments, it is possible to provide the insert nut capable of suppressing defects that may occur when a force of pulling out the insert nut from the substrate strongly acts during screw fastening.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-038875, filed Feb. 28, 2014, which is hereby incorporated by reference herein in its entirety.

What is claimed is:

1. A fastening unit, which is configured to fasten a member to be fastened, the fastening unit comprising:
   a screw including (i) an external thread portion having a size of M3 and (ii) a head portion having a seating face on the head portion, the seating face (i) being configured to face the member to be fastened and (ii) having a shape that, starting at a position of the seating face away from a rotation axis of the screw and moving in a direction toward the rotation axis of the screw, is increasingly distanced from the external thread portion of the screw, a nominal diameter of the screw being 3 mm; and
   an insert nut, which is configured to be inserted into a substrate made of a resin, the insert nut including:
      an internal thread portion into which the screw is to be fastened to fix the member to the substrate;
      a recess-and-protrusion-shaped portion formed on an outer surface of the insert nut, the recess-and-protrusion-shaped portion including a plurality of ridges and a plurality of roots formed alternately in a circumferential direction; and
      a flange portion formed on one end side in a screw axial direction of the internal thread portion, the flange portion (i) being provided on an upstream end of the insert nut in an insertion direction of the screw, and (ii) having an outer diameter that is 7.2 mm or more and 12 mm or less.

2. A fastening unit according to claim 1, wherein the outer diameter of the flange portion is 8/3 times or more as large as the nominal diameter of the screw to be fastened into the insert nut.

3. A fastening unit according to claim 1, further comprising a process cartridge, the process cartridge including the insert nut.

4. A fastening unit, which is configured to fasten a member to be fastened, the fastening unit comprising:
   a screw including (i) an external thread portion having a size of M3 and (ii) a head portion having a seating face on the head portion, the seating face (i) being configured to face the member to be fastened and (ii) having a shape that, starting at a position of the seating face away from a rotation axis of the screw and moving in a direction toward the rotation axis of the screw, is increasingly distanced from the external thread portion of the screw; and
   an insert nut, which is configured to be inserted into a substrate made of a resin, the insert nut including:
      an internal thread portion into which the screw is to be fastened to fix the member to the substrate;
      a recess-and-protrusion-shaped portion formed on an outer surface of the insert nut, the recess-and-protrusion-shaped portion including a plurality of ridges and a plurality of roots formed alternately in a circumferential direction; and
      a flange portion formed on one end side in a screw axial direction of the internal thread portion, the flange portion being provided on an upstream end of the insert nut in an insertion direction of the screw, and (ii) having an outer diameter that is 7.5 mm or more.

5. A fastening unit according to claim 4, wherein the outer diameter of the flange portion is 8/3 times or more as large as the nominal diameter of the screw to be fastened into the insert nut.

6. A fastening unit, which is configured to fasten a member to be fastened, the fastening unit comprising:
   a screw including (i) an external thread portion having a size of M4 and (ii) a head portion having a seating face on the head portion, the seating face (i) being configured to face the member to be fastened and (ii) having a shape that, starting at a position of the seating face away from a rotation axis of the screw and moving in a direction toward the rotation axis of the screw, is increasingly distanced from the external thread portion of the screw, a nominal diameter of the screw being 4 mm; and
   an insert nut, which is configured to be inserted into a substrate made of a resin, the insert nut including:
      an internal thread portion into which the screw is to be fastened to fix the member to the substrate;
      a recess-and-protrusion-shaped portion formed on an outer surface of the insert nut, the recess-and-protrusion-shaped portion including a plurality of ridges and a plurality of roots formed alternately in a circumferential direction; and
      a flange portion formed on one end side in a screw axial direction of the internal thread portion, the flange portion (i) being provided on an upstream end of the insert nut in an insertion direction of the screw, and (ii) having an outer diameter that is 8.8 mm or more and 16 mm or less.

7. A fastening unit according to claim 6, wherein the outer diameter of the flange portion is 10 mm or more.

8. A fastening unit, which is configured to fasten a member to be fastened, the fastening unit comprising:
   a screw including (i) an external thread portion having a size of M3 and (ii) a head portion having a seating face on the head portion, the seating face (i) being configured to face the member to be fastened and (ii) having a shape that, starting at a position of the seating face away from a rotation axis of the screw and moving in a direction toward the rotation axis of the screw, is increasingly distanced from the external thread portion of the screw, a nominal diameter of the screw being 3 mm; and
   an insert nut, which is configured to be inserted into a substrate made of a resin, the insert nut including:
      an internal thread portion into which the screw is to be fastened to fix the member to the substrate;
      a recess-and-protrusion-shaped portion formed on an outer surface of the insert nut, the recess-and-protrusion-shaped portion including a plurality of ridges and a plurality of roots formed alternately in a circumferential direction; and
      a flange portion formed on one end side in a screw axial direction of the internal thread portion, the flange portion being provided on an upstream end of the insert nut in an insertion direction of the screw, and (ii) having an outer diameter that is equal to or more than 90% of an outer diameter of the contact portion of the seating face of the screw, which is brought into contact with the member to be fastened, when the screw is fastened.

9. The fastening unit according to claim 8, wherein the seating face of the screw has a dish-like recessed portion, and the contact portion comprises the periphery of the dish-like recessed portion.

10. A fastening unit, which is configured to fasten a member to be fastened, the fastening unit comprising:
- a screw including (i) an external thread portion having a size of M3 and (ii) a head portion having a seating face on the head portion, the seating face (i) being configured to face the member to be fastened and (ii) having a shape that, starting at a position of the seating face away from a rotation axis of the screw and moving in a direction toward the rotation axis of the screw, is increasingly distanced from the external thread portion of the screw, a nominal diameter of the screw being 3 mm; and
- an insert nut, which is configured to be inserted into a substrate made of a resin, the insert nut including:
  - an internal thread portion into which the screw is to be fastened to fix the member to the substrate;
  - a recess-and-protrusion-shaped portion formed on an outer surface of the insert nut, the recess-and-protrusion-shaped portion including a plurality of ridges and a plurality of roots formed alternately in a circumferential direction; and
  - a flange portion formed on one end side in a screw axial direction of the internal thread portion, the flange portion having an outer diameter that is equal to or more than 90% of an outer diameter of the screw head portion of the screw.

11. A fastening unit, which is configured to fasten a member to be fastened, the fastening unit comprising:
- a screw including (i) an external thread portion having a size of M4 and (ii) a head portion having a seating face on the head portion, the seating face (i) being configured to face the member to be fastened and (ii) having a shape that, starting at a position of the seating face away from a rotation axis of the screw and moving in a direction toward the rotation axis of the screw, is increasingly distanced from the external thread portion of the screw, a nominal diameter of the screw being 4 mm; and
- an insert nut, which is configured to be inserted into a substrate made of a resin, the insert nut including:
  - an internal thread portion into which the screw is to be fastened to fix the member to the substrate;
  - a recess-and-protrusion-shaped portion formed on an outer surface of the insert nut, the recess-and-protrusion-shaped portion including a plurality of ridges and a plurality of roots formed alternately in a circumferential direction; and
  - a flange portion formed on one end side in a screw axial direction of the internal thread portion, the flange portion (i) being provided on an upstream end of the insert nut in an insertion direction of the screw, and (ii) having an outer diameter that is equal to or more than 90% of an outer diameter of a contact portion of the seating face of the screw, which is brought into contact with the member to be fastened, when the screw is fastened.

12. The fastening unit according to claim 11, wherein the seating face of the screw has a dish-like recessed portion, and the contact portion comprises the periphery of the dish-like recessed portion.

13. A fastening unit, which is configured to fasten a member to be fastened, the fastening unit comprising:
- a screw including (i) an external thread portion having a size of M4 and (ii) a head portion having a seating face on the head portion, the seating face (i) being configured to face the member to be fastened and (ii) having a shape that, starting at a position of the seating face away from a rotation axis of the screw and moving in a direction toward the rotation axis of the screw, is increasingly distanced from the external thread portion of the screw, a nominal diameter of the screw being 4 mm; and
- an insert nut, which is configured to be inserted into a substrate made of a resin, the insert nut including:
  - an internal thread portion into which the screw is to be fastened to fix the member to the substrate;
  - a recess-and-protrusion-shaped portion formed on an outer surface of the insert nut, the recess-and-protrusion-shaped portion including a plurality of ridges and a plurality of roots formed alternately in a circumferential direction; and
  - a flange portion formed on one end side in a screw axial direction of the internal thread portion, the flange portion having an outer diameter of the flange portion of the insert nut is equal to or more than 90% of an outer diameter of the screw head portion of the screw.

* * * * *